United States Patent
Froy et al.

(10) Patent No.: US 12,067,844 B2
(45) Date of Patent: *Aug. 20, 2024

(54) ELECTRONIC GAMING MACHINES WITH DYNAMIC AUTO PLAY MODE METHODS ENABLED BY AI-BASED PLAYSTYLE MODELS

(71) Applicant: IGT, Las Vegas, NV (US)

(72) Inventors: David Froy, Lakeville-Westmorland (CA); Karen Van Niekerk, Dieppe (CA); Thomas Trenkler, Thal (AT); Adam Narducci, Reno, NV (US); Michael Russ, Graz (AT)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/198,909

(22) Filed: May 18, 2023

(65) Prior Publication Data

US 2023/0306818 A1 Sep. 28, 2023

Related U.S. Application Data

(63) Continuation of application No. 17/402,003, filed on Aug. 13, 2021, now Pat. No. 11,676,453.

(51) Int. Cl.
*G07F 17/32* (2006.01)
*G06N 3/02* (2006.01)

(52) U.S. Cl.
CPC ............ *G07F 17/326* (2013.01); *G06N 3/02* (2013.01); *G07F 17/3237* (2013.01)

(58) Field of Classification Search
CPC ..... G07F 17/326; G07F 17/3237; G06N 3/02; G06N 3/08

USPC .......................................................... 463/25
See application file for complete search history.

(56) References Cited

U.S. PATENT DOCUMENTS

| | | | |
|---|---|---|---|
| 8,147,334 B2 | 4/2012 | Gatto et al. | |
| 8,668,578 B2 * | 3/2014 | Linard | A63F 9/18 463/22 |
| 8,764,566 B2 | 7/2014 | Miltenberger et al. | |
| 11,676,453 B2 | 6/2023 | Froy et al. | |
| 2006/0217173 A1 * | 9/2006 | Walker | G07F 17/3234 463/16 |
| 2007/0087818 A1 * | 4/2007 | Walker | G07F 17/3244 463/25 |

(Continued)

OTHER PUBLICATIONS

Official Action for U.S. Appl. No. 17/402,003, dated Aug. 30, 2022 7 pages.

(Continued)

*Primary Examiner* — Pierre E Elisca
(74) *Attorney, Agent, or Firm* — Sheridan Ross P.C.

(57) ABSTRACT

The present disclosure relates generally to a gaming system, device, and method supportive of an enhanced electronic gaming machine auto play mode. A gaming system, device, and method are provided that identify data associated with a set of previous gameplay sessions, the data including a set of previous gameplay decisions associated with the set of previous gameplay sessions; generate a set of playstyle models based on the set of previous gameplay decisions; and enable a gameplay mode in which a playstyle model of the set of playstyle models may be utilized to provide automated player inputs to a gameplay session.

20 Claims, 5 Drawing Sheets

(56) References Cited

U.S. PATENT DOCUMENTS

| | | | |
|---|---|---|---|
| 2009/0029766 A1* | 1/2009 | Lutnick | G07F 17/32 463/29 |
| 2011/0065490 A1* | 3/2011 | Lutnick | G07F 17/3223 463/16 |
| 2013/0116032 A1* | 5/2013 | Lutnick | G07F 17/32 463/25 |
| 2013/0303274 A1* | 11/2013 | Gadher | G07F 17/3209 463/29 |
| 2013/0310156 A1* | 11/2013 | Gadher | G07F 17/3237 463/25 |

OTHER PUBLICATIONS

Notice of Allowance for U.S. Appl. No. 17/402,003, dated Feb. 6, 2023 9 pages.

* cited by examiner

ELECTRONIC GAMING MACHINES WITH DYNAMIC AUTO PLAY MODE METHODS ENABLED BY AI-BASED PLAYSTYLE MODELS

CROSS REFERENCE TO RELATED APPLICATION

The present application is a continuation of and claims the benefit of and priority to U.S. patent application Ser. No. 17/402,003, filed Aug. 13, 2021, the entire disclosure of which is incorporated herein by reference.

BACKGROUND

The present disclosure is generally directed toward gaming devices and systems and, more specifically, dynamic auto play modes of an Electronic Gaming Machine (EGM) enabled by artificial intelligence (AI)-based playstyle models.

In some gaming systems, an EGM may include an auto play mode which, when activated, may repeatedly implement plays (e.g., spins) at the EGM based on current wager settings without manual intervention by a player.

BRIEF SUMMARY

In certain aspects, the present disclosure relates to a gaming system, device, and method supportive of dynamic auto play modes of an EGM, enabled by AI-based playstyle models. Aspects of the present disclosure also relate to dynamically providing enhanced auto play modes that are based on playstyle behavior.

A gaming system is provided that includes: a communication interface; a processor coupled with the communication interface; and a computer-readable storage medium coupled with the processor, the computer-readable storage medium including processor-executable instructions that, when executed by the processor, cause the processor to: identify data associated with a set of previous gameplay sessions, the data including a set of previous gameplay decisions associated with the set of previous gameplay sessions; generate a set of playstyle models based on the set of previous gameplay decisions; and enable a gameplay mode in which a playstyle model of the set of playstyle models may be utilized to provide automated player inputs to a gameplay session.

A device is provided that includes: a communication interface; a processor coupled with the communication interface; and a computer-readable storage medium coupled with the processor, the computer-readable storage medium including processor-executable instructions that, when executed by the processor, cause the processor to: identify data associated with a set of previous gameplay sessions, the data including a set of previous gameplay decisions associated with the set of previous gameplay sessions; generate a set of playstyle models based on the set of previous gameplay decisions; and enable a gameplay mode in which a playstyle model of the set of playstyle models may be utilized to provide automated player inputs to a gameplay session.

A method is provided that includes: identifying data associated with a set of previous gameplay sessions, the data including a set of previous gameplay decisions associated with the set of previous gameplay sessions; generating a set of playstyle models based on the set of previous gameplay decisions; and enabling a gameplay mode in which a playstyle model of the set of playstyle models may be utilized to provide automated player inputs to a gameplay session.

Additional features and advantages are described herein and will be apparent from the following Description and the figures.

DETAILED DESCRIPTION

Figure 1:
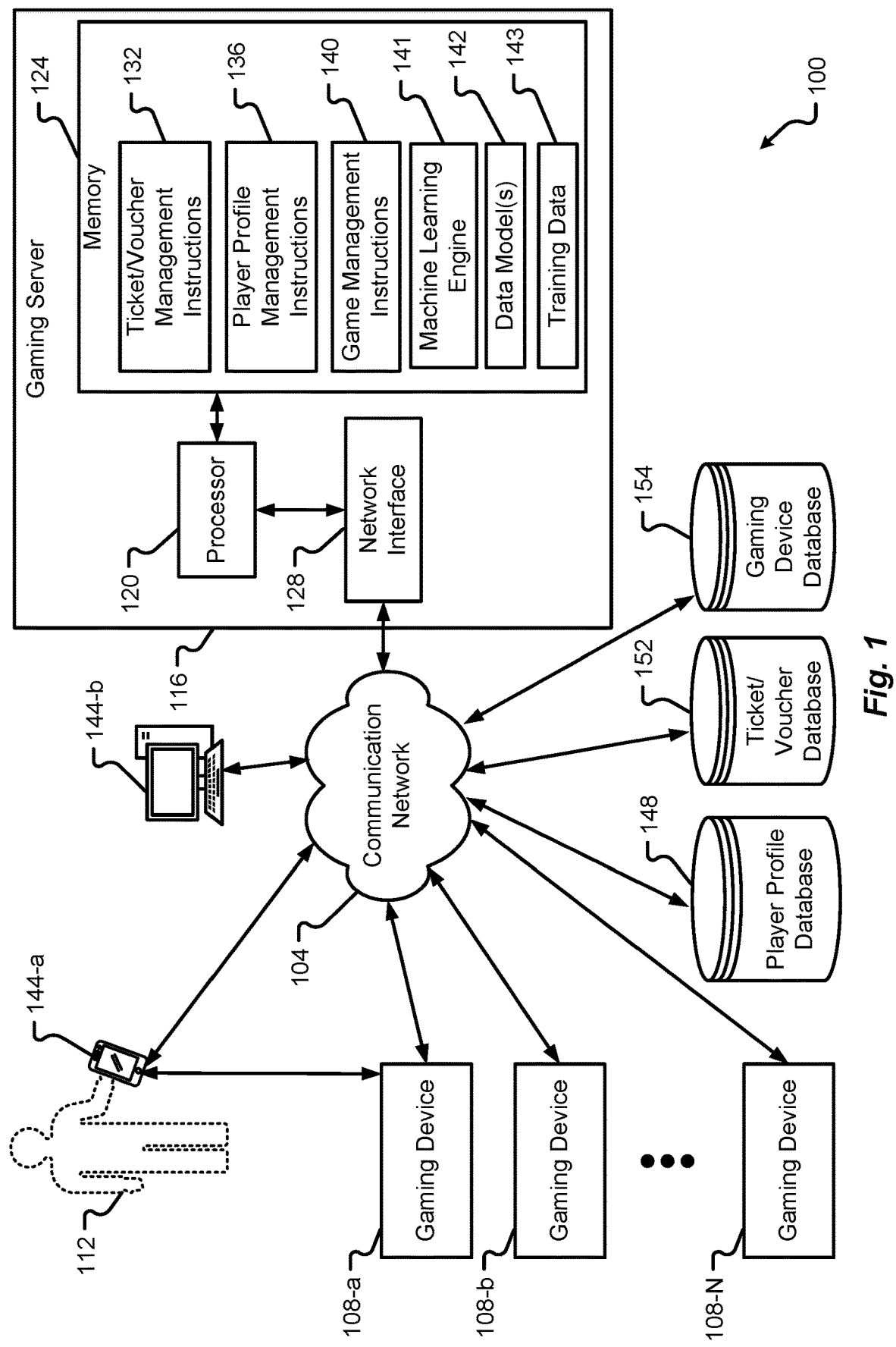
FIG. 1 is a block diagram of a gaming system in accordance with aspects of the present disclosure.

Aspects of the present disclosure will be described in connection with dynamic auto play modes of a gaming device enabled by artificial intelligence (AI)-based playstyle models. While some examples in the present disclosure may reference the use of an Electronic Gaming Machine (EGM) as a gaming device via which players may participate in gaming activity, it should be appreciated that aspects of the present disclosure are not so limited. For example, any computing device, personal gaming device, or collection of computing devices may be used to facilitate invoking dynamic auto play modes of a gaming device according to AI-based playstyle models.

In some gaming systems, auto play modes associated with a gaming device may be static and lack different functionalities. For example, when an auto play mode is activated at the gaming device, the gaming device may repeatedly implement plays (e.g., spins) based on current wager settings. In an example, the gaming device may operate in the auto play mode until the auto play mode is deactivated by the player or the remaining gameplay credits fall below a threshold for additional plays.

Aspects of the present disclosure provide enhancements to auto play modes at a gaming device. For example, the auto play modes described herein may be implemented dynamically during a gameplay session and according to a playstyle behavior. Example aspects described herein may provide increased variety associated with auto play modes at a gaming device, providing increased excitement for a player.

In some examples, the auto play modes described herein may be implemented dynamically during a gameplay session and may incorporate pre-created playstyle models. In an example, a server may enable player-based selection and activation of such auto play modes. The server may notify a player (e.g., via a display on a gaming device, via a communication device in communication with the gaming device and/or the server) that an auto play mode is available for activation at the gaming device. In some aspects, the server may provide a notification indicating available playstyle models for the auto play mode.

In response to the selection of a playstyle model and activation of an auto play mode, the gaming device may play on the player's behalf and in the player's interest, in accordance with the playstyle model. For example, the gaming device may play on the player's behalf based on the characteristics and behaviors of the playstyle model. Example aspects of the present disclosure are described with respect to generating such playstyle models, implementing the playstyle models in dynamic auto-play modes, and use cases associated with generating and/or implementing the playstyle models.

The auto play modes described herein may support intelligent, automated gameplay decisions compared to auto play modes in some other gaming systems. For example, a gaming system (e.g., a gaming server, a gaming device, and/or a communication device described herein) may support autonomously generating, selecting, and applying playstyle models (e.g., suggesting and/or implementing gameplay decisions) described herein. Example implementations of auto play modes of the present disclosure may support improved user experiences associated with improved gaming experiences, increased gameplay variety, and increased player excitement compared to some other auto play modes. Such improved user experiences associated with the auto play modes described herein may support higher revenues in a gaming system (e.g., a casino environment).

With reference initially to FIG. 1, details of an illustrative gaming system 100 will be described in accordance with at least some embodiments of the present disclosure. The components of the gaming system 100, while depicted as having particular instruction sets and devices, are not necessarily limited to the examples depicted herein. Rather, a system according to embodiments of the present disclosure may include one, some, or all of the components depicted in the gaming system 100 and does not necessarily have to include all of the components in a single device. For example, the components of a server may be distributed amongst a plurality of servers and/or other devices (e.g., a gaming device, a portable user device, etc.) in the gaming system 100 without departing from the scope of the present disclosure.

The gaming system 100 may include a communication network 104 that interconnects and facilitates machine-to-machine communications between one or multiple gaming devices 108 (e.g., any of gaming device 108-a through 108-N) and a gaming server 116. It should be appreciated that the communication network 104 may correspond to one or many communication networks without departing from the scope of the present disclosure. In some embodiments, gaming device 108-a through gaming device 108-N and gaming server(s) 116 may be configured to communicate using various nodes or components of the communication network 104. The communication network 104 may include any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may include a number of different communication media such as coaxial cable, copper cable/wire, fiber-optic cable, antennas for transmitting/receiving wireless messages, and combinations thereof.

In some embodiments, the gaming devices 108 (e.g., gaming device 108-a through gaming device 108-N) may be distributed throughout a single property or premises (e.g., a single casino floor), or the gaming devices 108 (e.g., gaming device 108-a through gaming device 108-N) may be distributed among a plurality of different properties. In a situation where the gaming devices 108 are distributed in a single property or premises, the communication network 104 may include at least some wired connections between network nodes. As a non-limiting example, the nodes of the communication network 104 may communicate with one another using any type of known or yet-to-be developed communication technology. Examples of such technologies include, without limitation, Ethernet, SCSI, PCIe, RS-232, RS-485, USB, ZigBee, WiFi, CDMA, GSM, HTTP, TCP/IP, UDP, etc.

The gaming devices 108 (e.g., gaming device 108-a through gaming device 108-N) may utilize the same or different types of communication protocols to connect with the communication network 104. It should also be appreciated that the gaming devices 108 (e.g., gaming device 108-a through gaming device 108-N) may present the same type of game or different types of games to a player 112. For example, the gaming device 108-a may correspond to a gaming machine that presents a slot game to the player 112, the gaming device 108-b may correspond to a video poker machine, and other gaming devices 108 may present other types of games (e.g., keno, sports wagering, etc.) or a plurality of different games for selection and eventual play by the player 112.

In some aspects, some of the gaming devices 108 (e.g., gaming device 108-a through gaming device 108-N) may communicate or exchange data with one another via the communication network 104. In some embodiments, one or more of the gaming devices 108 may be configured to communicate directly with a centralized management server and/or the gaming server 116. Although not depicted, the gaming system 100 may include a separate server or collection of servers that are responsible for managing the operation of the various gaming devices 108 in the gaming system 100.

It should also be appreciated that the gaming server 116 may or may not be co-located with one or more gaming devices in the same property or premises. Thus, one or more gaming devices may communicate with the gaming server 116 over a WAN, such as the Internet. In such an event, a tunneling protocol or Virtual Private Network (VPN) may be established over a portion of the communication network 104 to ensure that communications between an EGM and the server 116 (e.g., a remotely-located server) are secured.

The gaming devices 108 (e.g., gaming device 108-*a* through gaming device 108-N) may correspond to a type of device that supports interaction by a player 112 in connection with playing games of chance. Examples of a gaming device 108 may include any type of known gaming device such as an EGM, a slot machine, a table game, an electronic table game (e.g., video poker), a skill-based game, etc. In addition to playing games on a gaming device 108, the player 112 may also be allowed to interact with and play games of chance on a communication device 144.

The gaming system 100 may support interaction with one or more communication devices 144. A communication device 144 (e.g., communication device 144-*a*) may be a mobile device of a player 112 (e.g., a personal communication device such as a smart phone, a tablet, a smart watch, etc.) or to a device issued by a casino to the player 112. It should be appreciated that the player 112 may play games directly on the communication device 144. Alternatively, or additionally, the communication device 144 may establish a communications (e.g., over a wireless or wired connection) with a gaming device 108 such that the communication device 144 provides an interface for the player 112 to interact with the gaming device 108. As shown in FIG. 1, the communication device 144 may be in communication with the communication network 104 or in direct communication (e.g., via Bluetooth, WiFi, etc.) with a gaming device 108. Non-limiting examples of a communication device 144 include a cellular phone, a smart phone, a tablet, a wearable device, an augmented reality headset, a virtual reality headset, a laptop, a Personal Computer (PC), or the like. In some cases, another communication device 144 (e.g., communication device 144-*b*) may be a mobile device, a PC, or the like of a casino operator (e.g., a floor attendant, a casino manager, etc.).

In some cases, the gaming system 100 may support "carding in" of a player at a gaming device 108 with a physical card (e.g., a player club card). In other cases, the gaming system 100 may support "carding in" of a player at a gaming device 108 via a mobile application on a communication device 144. In some aspects, the mobile application may support fund transfers between a player account and the gaming device 108 (e.g., a server, the casino). For example, using the mobile application, the player may transfer funds to a gaming session.

In an example of "carding in," the communication device 144 may exchange information with the gaming device 108 over a wireless connection (e.g., near field communication (NFC), Bluetooth, etc.) when the communication device 144 is within a threshold distance of the gaming device 108. In another aspect, the communication device 144 may "card in" and exchange information with the gaming device 108 when the communication device 144 is connected to the gaming device 108 using a physical communications link (e.g., a communications cable). In an example, when "carding in," the communication device 144 may provide player identification information (e.g., player identity, player club status, player preference information, etc.) to the gaming device, the server, and/or the gaming system. The gaming server 116 (or the gaming device 108) may establish a gaming session at the gaming device 108 for the player based on the information provided during the "card in".

The gaming server 116 is further shown to include a processor 120, a memory 124, and a network interface 128. These resources may enable functionality of the gaming server 116 as will be described herein. For example, the network interface 128 provides the server 116 with the ability to send and receive communication packets or the like over the communication network 104. The network interface 128 may be provided as a network interface card (NIC), a network port, drivers for the same, and the like. Communications between the components of the server 116 and other devices connected to the communication network 104 may all flow through the network interface 128.

The processor 120 may correspond to one or many computer processing devices. For example, the processor 120 may be provided as silicon, as a Field Programmable Gate Array (FPGA), an Application-Specific Integrated Circuit (ASIC), any other type of Integrated Circuit (IC) chip, a collection of IC chips, a microcontroller, a collection of microcontrollers, or the like. As a more specific example, the processor 120 may be provided as a microprocessor, Central Processing Unit (CPU), or plurality of microprocessors that are configured to execute the instructions sets stored in memory 124. Upon executing the instruction sets stored in memory 124, the processor 120 enables various authentication functions of the gaming server 116.

The memory 124 may include any type of computer memory device or collection of computer memory devices. The memory 124 may be volatile or non-volatile in nature and, in some embodiments, may include a plurality of different memory devices. Non-limiting examples of memory 124 include Random Access Memory (RAM), Read Only Memory (ROM), flash memory, Electronically-Erasable Programmable ROM (EEPROM), Dynamic RAM (DRAM), etc. The memory 124 may be configured to store the instruction sets depicted in addition to temporarily storing data for the processor 120 to execute various types of routines or functions. Although not depicted, the memory 124 may include instructions that enable the processor 120 to store data to and retrieve data from a player profile database 148, a ticket/voucher database 152, and/or a gaming device database 154.

Alternatively or additionally, the player profile database 148 or data stored thereon may be stored internal to the any of the communication device 144, a gaming device 108, and/or the server 116 (e.g., within the memory 124 of the server 116 rather than in a separate database). Alternatively or additionally, the ticket/voucher database 152 or data stored therein may be stored internal to the server 116. Alternatively or additionally, the gaming device database 154 or data stored thereon may be stored internal to the server 116.

The databases described herein (e.g., player profile database 148, ticket/voucher database 152, gaming device database 154) may include a relational database, a centralized database, a distributed database, an operational database, a hierarchical database, a network database, an object-oriented database, a graph database, a NoSQL (non-relational) database, etc. In some aspects, the databases may store and provide access to, for example, any of the stored data described herein.

The illustrative instruction sets that may be stored in memory 124 include, without limitation, a ticket/voucher management instruction set 132, a player profile management instruction set 136, and a game management instruction set 140. Functions of the server 116 enabled by these various instruction sets will be described in further detail herein. It should be appreciated that the instruction sets depicted in FIG. 1 may be combined (partially or completely) with other instruction sets or may be further separated into additional and different instruction sets, depending upon configuration preferences for the server 116. Said another way, the particular instruction sets depicted in FIG. 1 should not be construed as limiting embodiments described herein.

In some embodiments, the ticket/voucher management instruction set 132, when executed by the processor 120, may enable the gaming server 116 to manage various tickets/vouchers issued by gaming devices 108 (e.g., gaming device 108-*a* through gaming device 108-N), manage ticket/voucher values, determine ticket/voucher states, update the ticket/voucher database 152, obtain information from the ticket/voucher database 152, determine that a ticket/voucher has been redeemed and notify the player profile management instruction set 136, etc. In embodiments where the ticket/voucher instruction set 132 is implemented in one system (e.g., a ticketing/voucher system) and the player profile management instruction set 136 is implemented in a separate system (e.g., a player tracking system), a communication link may or may not be implemented between the two systems. In such a situation, the tickets/vouchers issued by the ticketing/voucher system may be anonymous and not necessarily associated with any particular player or player profile.

In some embodiments, the ticket/voucher management instruction set 132 may be configured to perform any action consistent with the issuance of tickets/vouchers, tracking of ticket/voucher states, and determining whether/when/where a ticket/voucher has been redeemed. In some embodiments, the ticket/voucher management instruction set 132 may be configured to generate, or cause the game management instruction set 140 to generate, a synthesized credit meter for the first gaming device. For example, as gaming devices 108 (e.g., gaming device 108-*a* through gaming device 108-N) or a communication device 144 have their credit meters updated, the gaming server 116 may update a corresponding synthesized credit meter to reflect updates at the credit meters. In some embodiments, values of credit or other events stored in credit meters of gaming device 108 and/or a communication device 144 may be mirrored in a synthesized credit meter maintained by the gaming server 116.

The player profile management instruction set 136, when executed by the processor 120, may enable the gaming server 116 to manage one or more player profiles within the player profile database 148. In some embodiments, the player profile management instruction set 136 may be configured to manage a player loyalty profile including settings for such player profiles, available wager credits for such profiles, determine player wager history, and/or determine which, if any, tickets/vouchers are associated with a particular player. It should also be appreciated that the player profile management instruction set 136 may be configured to manage player profiles of players that do not have loyalty accounts or any other predetermined player account.

In some aspects, the player profile management instruction set 136 may be configured to manage a player history associated with gameplay sessions. In an example, the player history may include user behavior (e.g., gameplay decisions) associated with previous and/or current gameplay sessions. In some other examples, the player history may include instances of auto play modes enabled on behalf of the player (e.g., instances in which the gaming server 116 made an auto play mode available for selection by a player).

For example, the player history may include playstyle models selected (e.g., by the gaming server 116, by the player, etc.) for an auto play mode. In some other examples, the player history may include instances of invoking (e.g., by the gaming server 116, by the player) auto play modes on behalf of the player. In some other examples, the player history may include instances of ending or pausing (e.g., by the gaming server 116, by the player) an active auto play mode. The player history may include gameplay decisions (e.g., proposed gameplay decisions based on a playstyle model, user decisions based on the proposed gameplay decisions, etc.) associated with an invoked auto play mode. In some aspects, in accordance with an invoked auto play mode, the gaming server 116, gaming devices 108 and/or communication device 144 may automatically apply gameplay decisions (e.g., proposed gameplay decisions) on behalf of the player.

The game management instruction set 140, when executed by the processor 120, may enable the gaming server 116 to manage the various games played by a player 112 at the gaming devices 108 (e.g., gaming device 108-*a* through gaming device 108-N) and/or a communication device 144 carried by the player 112. For example, any game played by the player 112 at any of the gaming devices 108 and/or communication device 144 may be managed, partially or entirely, by execution of the game management instruction set 140. The game management instruction set 140 may also be configured to track a status of wager events (e.g., non-EGM wager games, sporting events, bingo, keno, lottery, etc.) and whether a player 112 has placed a wager on such events. In some embodiments, when a wager event has come to completion such that wagers made on the event become payable (e.g., at the end of a gameplay decision at a gaming device 108 and/or communication device 144, at the end of a sporting event when the final score of the event is determined), the game management instruction set 140 may notify the ticket/voucher management instruction set 132, thereby enabling the ticket/voucher management instruction set 132 to update states and/or values of tickets/vouchers issued for the event appropriately.

In some aspects, the game management instruction set 140, when executed by the processor 120, may enable the gaming server 116 to manage and/or monitor data associated with a gameplay session at a gaming device 108. For example, the gaming server 116 may support example aspects described herein of monitoring user information (e.g., member identification information, player club status, etc.), gameplay data (e.g., quantity of plays, quantity of spins, duration of gameplay, credits spent, credits earned, etc.), and gameplay mode information (e.g., current gameplay mode, playstyle model applied to the gameplay mode, etc.) associated with a gameplay session at the gaming device 108. The gaming server 116 may update the gaming device database 154, obtain information from the gaming device database 154, determine gaming devices 108 that are in auto play mode, and notify the game management instruction set 140, etc.

In an example, the gaming server 116 may support example aspects described herein of identifying historical data (e.g., previous gameplay decisions) associated with previous gameplay sessions at gaming devices 108. In another example, the gaming server 116 may support example aspects described herein of identifying current data (e.g., gameplay decisions) associated with a current gameplay session at a gaming device 108. The gaming server 116 may provide any of the historical data and/or current data to a machine learning engine 141 (e.g., as inputs to a data model(s) 142, as training data 143, etc.), example aspects of which are described herein. In some aspects, gameplay decisions may be associated with decision events such as wager selections, gameplay choices (e.g., a player decision in a video poker game, selected pay lines at a slot machine, etc.), bonus/prize selections, etc.

In some examples, the game management instruction set 140 may enable the gaming server 116 to manage gameplay modes (e.g., auto play modes) of gaming devices 108. In an example, the gaming server 116 may support example aspects described herein of enabling a gameplay mode (e.g., an auto play mode) in which a playstyle model(s) is utilized to provide automated player inputs to a gameplay session at a gaming device 108. In an example, the gaming server 116 may enable a fully-autonomous auto play mode at a gaming device 108. That is, for example, the gaming server 116, a gaming device 108, and/or a communication device 108 may autonomously generate, select, and/or apply playstyle models (e.g., propose and/or implement gameplay decisions) described herein. In some other examples, the gaming server 116 may enable a semi-autonomous auto play mode at a gaming device 108.

The gaming server 116 may support example aspects described herein of outputting notifications associated with a gameplay mode. For example, the gaming server 116 may output notifications indicating whether an auto play mode is available to the player, an indication of the auto play mode (e.g., whether the auto play mode has been invoked and/or ended), an indication of a playstyle model applied to the auto play mode, etc. In some examples, for an auto play mode applied to a gameplay session, the gaming server 116 may output notifications indicating predicted gameplay parameters associated with a playstyle model applied to the auto play mode. In an example, the predicted gameplay parameters may include a predicted gameplay duration (e.g., amount of time until gameplay credits are exhausted) associated with the playstyle model, a predicted risk factor (e.g., risk level) associated with the playstyle model, average gameplay credits spent over a time period when applying the playstyle model, and/or a recommendation of how much money to insert to secure a desired amount of time at a gaming device 108.

According to example aspects of the present disclosure, the processor 120 may utilize data stored in the memory 124 as a neural network. The neural network may be, for example, a machine learning network and may include a machine learning architecture. In some aspects, the neural network may be or include an artificial neural network (ANN). In some other aspects, the neural network may be or include any machine learning network such as, for example, a deep learning network, a convolutional neural network, or the like. Some or all of instructions or instruction sets stored in the memory 125 and some functions of the gaming server 116, gaming devices 108, and/or communication devices 144 may be implemented using machine learning techniques. In some cases, the machine learning techniques may include deep learning and reinforcement learning.

In some aspects, the neural network may support K-means clustering of training data 143. For example, the training data 143 may include gameplay data and player behavior (e.g., player decisions) associated with previous gameplay sessions at gaming devices 108 (e.g., based on game type, based on a player profile, etc.). In some examples, the training data 143 may include gameplay data and player behavior (e.g., player decisions) associated with a current gameplay session at a gaming device 108. For example, the training data 143 may include previous data (e.g., gameplay data, player behavior, gameplay decisions, etc.) from the same player as well as previous data (e.g., gameplay data, player behavior, gameplay decisions, etc.) from other players (e.g., similar players, players having similar playstyle characteristics, etc.) in the venue.

In an example, the training data 143 may include a dataset (e.g., gameplay data, player behavior, etc.), and the neural network may implement a K-means algorithm which includes iteratively partitioning the dataset into K pre-defined, distinct, non-overlapping subgroups (also referred to herein as clusters or playstyles) where each data point belongs to only one subgroup. In some cases, implementation of the K-means algorithm may include partitioning the dataset such that intra-cluster data points are as similar as possible (e.g., within a threshold criteria) while clusters are as different (e.g., far, in accordance with a threshold distance) as possible. In an example, the clusters may be identifiable from the analyzed dataset (e.g., gameplay data) based on a set of features pre-defined at the gaming system 100. In some aspects, the gaming system 100 may support defining and/or modifying (e.g., redefining, reconfiguring) the set of features at the gaming server 116 or a communication device 144 (e.g., by a casino establishment, a casino manager, etc.).

Example features include: a credit amount at the start of a gameplay session (e.g., 'SumCashInAmount'), a credit amount at the end of a gameplay session (e.g., 'SumCashOutAmount'), quantity of wager adjustments during a temporal period and/or during a gameplay session (e.g., 'No. of bet changes'), a ratio of a wager amount to a player bankroll (e.g., 'Wager-Bank-Ratio'), gameplay duration associated with gameplay session (e.g., 'TimePlayed'), average wager amount for a primary game (base game) (e.g., 'AverageWagerPrimary'), an average win amount associated with a primary game (e.g., 'AveragePrimaryWinAmount'), quantity of primary games played during a temporal period and/or during a gameplay session (e.g., 'No.PrimaryGamesPlayed'), quantity of secondary games (bonus games) played during a temporal period and/or during a gameplay session (e.g., 'No.SecondaryGamesPlayed), or the like.

In some aspects, the neural network may generate an output including data summaries associated with each cluster. Each data summary may include an indication of any combination of features defined at the gaming system 100. An example data summary for a cluster is below:

Summary of this Cluster:
Percentage of sessions assigned to this cluster: 19.8%
Number of wagers is less than average.
Sessions are shorter than average.
The average primary wagers were average.
Wagers are the most correlated with cash (positive).
Players played one game.
Did not change bet (NoDistinctWagerPrimary).

In some aspects, the gaming system 100 may support assigning playstyle names to each cluster. In some examples, the gaming system 100 may support manual entry and assignment of playstyle names to each cluster. Some example playstyle names include: 'Time Killer', 'Entertainment Player', 'Gambler', 'Money Chaser', 'Bonus Chaser', and 'High Roller'.

The memory 124 may be configured to store program instructions (instruction sets) that are executable by the processor 120 and provide functionality of a machine learning engine 141. The memory 124 may also be configured to store data or information that is useable or capable of being called by the instructions stored in memory 124. One example of data that may be stored in memory 124 for use by components thereof is a data model(s) 142 and/or training data 143. The data model(s) 142 may be a neural network model. The training data 143 may include training data and feedback.

The machine learning engine 141 may include a single or multiple engines. The gaming server 116 (e.g., the machine learning engine 141) may utilize one or more data models 142 for recognizing and processing information obtained from gaming devices 108, communication devices 144, other servers, and/or databases (e.g., player profile database 148, gaming device database 154, ticket/voucher database 152). In some aspects, the gaming server 116 (e.g., the machine learning engine 141) may update one or more data models 142 based on learned information included in the training data 143. In some aspects, the machine learning engine 141 and the data models 142 may support forward learning based on the training data 143. The machine learning engine 141 may have access to and use one or more data models 142. For example, the data model(s) 142 may be built and updated by the machine learning engine 141 based on the training data 143. The data model(s) 142 may be provided in any number of formats or forms. Non-limiting examples of the data model(s) 142 include autoregressive models, Decision Trees, Random Forest, Support Vector Machines (SVMs), Nearest Neighbor, and/or Bayesian classifiers.

The training data 143 may include any data managed by the gaming server 116 with respect to the ticket/voucher management instruction set 132, the player profile management instruction set 136, and/or the game management instruction set 140 described herein. For example, the training data 143 may include player histories (e.g., gameplay data, player behavior, etc.) associated with gameplay sessions at a gaming device(s) 108. In some aspects, the training data 143 may be stored (e.g., in the memory 124, a database, etc.) according to player profile and/or game type. In some examples, the training data 143 may include player histories (e.g., gameplay data, player behavior, etc.) associated with previously invoked auto play modes. In some aspects, the machine learning engine 141 may be configured to analyze aggregated player histories, gameplay data, and/or auto play mode parameters, that are historical or in real-time.

According to example aspects of the present disclosure, the data model(s) 142 may include pre-created, self-learning AI-based playstyle models. In an example, the playstyle models may represent playstyle behaviors. For example, the playstyle models may include playstyle behavior or gameplay patterns associated with gameplay decisions (e.g., game configurations, wager amounts, etc.), gameplay style (e.g., risk taking, risk averse/conservative, etc.), or the like. In some aspects, a "playstyle model" described herein may correspond to gameplay patterns and/or gameplay style of a player, and may also be referred to herein as a "player model."

In some examples, a playstyle model may correspond to a playstyle behavior corresponding to a player profile. For example, the gaming system 100 may support playstyle models which implement gameplay decisions and/or gameplay patterns that correspond to respective playstyles of different player profiles (e.g., different players). For example, a playstyle model corresponding to a player profile may be trained (e.g., at the gaming server 116, the machine learning engine 141, etc.) based on previous and/or current gameplay decisions by a player associated with the player profile.

The playstyle models may be built to represent "common playstyle behaviors" derived from K-means clustering of previous (e.g., pre-collected) gameplay data and gameplay behaviors. The playstyle models may support fully-autonomous and/or semi-autonomous gameplay at a gaming device 108 according to certain player-like play behaviors.

In an example, the playstyle models may be provided (e.g., by the gaming server 116, a communication device 144, a gaming device 108) with a "memory" over past gaming events (e.g., the last X events, where X may be a variable parameter value). In an example, for a gameplay session at a gaming device 108, subsequent decisions by the playstyle model may be based on previous events (e.g., previous gameplay decisions by the playstyle model, previous gameplay decisions by a player, a gameplay result associated with a previous gameplay decision, etc.) in the gameplay session.

For example, reflecting previous events, each playstyle model may execute decisions according to its own decision tree or random forest to perform an action (e.g., a gameplay decision). Alternative or additional to the playstyle models, gameplay decisions associated with an auto play mode at a gaming device 108 may be implemented by a neural network based on frame buffer feedback.

In some aspects, the techniques described herein my incorporate AI mechanisms (e.g., machine learning engine 141, data model(s) 142, etc.) which provide functionality to detect a player's playstyle. Based on the detected playstyle, such AI mechanisms may adjust gameplay settings at a gaming device 108 to better meet a player's preferred and expected play style behavior. Some example settings may include wager amounts, payline settings (e.g., in a case of a reel machine), etc. In some aspects, the AI may be fed with gameplay data (e.g., training data 143) of previous gameplay sessions to derive behavioral results to create the biggest player satisfaction.

In some examples, the AI may generate playstyle models based on previous gameplay sessions associated with the same player, previous gameplay sessions associated with players of a similar type (e.g., players associated with an entertainment playstyle, a 'high roller' playstyle, a 'jackpot hunter' playstyle, etc.), previous gameplay sessions associated with similar markets (e.g., markets having overlapping characteristics), previous gameplay sessions associated with similar venues (e.g., venues having overlapping characteristics), etc.

In some aspects, the gaming system 100 may support executable playstyle models that may be invoked on behalf of a player. In an example, the gaming server 116 may provide selectable playstyle models to a player via a user interface of the gaming device 108 and/or via a user interface of a communication device 144. In some cases, the gaming server 116 may derive the playstyle models from data analytics (e.g., included in training data 143), and the derived playstyle models may reflect different player profiles and/or different playstyle behaviors.

The playstyle models may be developed, generated, and/or trained (e.g., by the gaming server 116, a communication device 144, etc.) using a data-driven approach or other machine learning techniques including deep learning and re-enforcement learning. In some cases, the playstyle models may be generated to mimic human behavior corresponding to a player and/or human behavior corresponding to a playstyle. In some cases, the playstyle models may be generated based on data (e.g., gameplay data, player data, etc.) acquired from different markets. The markets, for example, may include casino markets associated with different geographical areas. The gaming server 116 may input data (e.g., gameplay data, player data, etc.) into a data model(s) 142 for analysis.

The machine learning engine 141 may build any number of configuration profiles (e.g., player profiles, gaming device 108 profiles, playstyle profiles) using automatic processing, using artificial intelligence and/or using input from one or more users associated with the communication device 144. The machine learning engine 141 may use automatic processing, artificial intelligence, and/or inputs from one or more users of the communication devices 144 to determine, manage, and/or combine information relevant to a configuration profile. Example aspects of such configuration profiles are described in further detail below.

The machine learning engine 141 may determine configuration profile information based on a user's interactions with information. The machine learning engine 141 may update (e.g., continuously, periodically, etc.) configuration profiles based on new information that is relevant. The machine learning engine 141 may receive new information from any communication device 144, the gaming server 116, any database described herein, etc. Profile information may be organized and classified in various manners. In some aspects, the organization and classification of configuration profile information may be determined by automatic processing, by artificial intelligence and/or by one or more users of a communication device 144 (e.g., a player, casino personnel, a casino manager, etc.).

In an example, the gaming server 116, a gaming device 108 and/or a communication device 144 may provide, to the machine learning engine 141, gameplay data and/or user information associated with a gameplay session (e.g., previous or current) at the gaming device 108. In an example, the gameplay data may include a quantity of plays (e.g., number of spins), duration of gameplay, credits spent, credits earned, etc. In some examples, the user information may include player identification information (e.g., stored on a player identification card, associated with a player access code, stored on a communication device 144 of a player, etc.). In some other examples, the user interface may include a playstyle model stored on a communication device 144 or other device (e.g., a portable memory device) of a player.

The machine learning engine 141 may process the gameplay data and/or user information using the data model(s) 142. For example, the machine learning engine 141 may process previous gameplay data (e.g., previous gameplay decisions), based on which the machine learning engine 141 may generate a playstyle model(s).

In another example, the gaming server 116 may provide gameplay data associated with a current gameplay session at a gaming device 108, to the machine learning engine 141. In an example, the gameplay data may include gameplay decisions associated with the current gameplay session. The machine learning engine 141 may process the gameplay decisions associated with the current gameplay session and generate an output based on processing the gameplay decisions.

For example, the machine learning engine 141 may identify a gameplay pattern associated with the gameplay decisions, and the machine learning engine 141 may identify a playstyle model that corresponds to the gameplay pattern. In an example, the machine learning engine 141 may compare the gameplay pattern to gameplay patterns associated with a set of playstyle models (e.g., data model(s) 142).

The output by the machine learning engine 141 may include an indication associated with an available auto play mode at the gaming device 108. For example, the output may include an indication of the identified playstyle model. In some examples, the machine learning engine 141 may identify the playstyle model based on whether gameplay data satisfies a set of criteria. For example, the gaming system 100 may support identifying playstyle models when a quantity of plays (e.g., number of spins) associated with a gameplay session (e.g., previous or current) is greater than or equal to a threshold quantity. In another example, the gaming system 100 may support identifying playstyle models when a duration of gameplay is greater than or equal to a threshold duration.

In some aspects, the machine learning engine 141 may generate a playstyle model(s) based on whether the gameplay data satisfies a set of criteria (e.g., threshold quantity of plays, threshold duration of gameplay). In some cases, the gaming server 116 may notify (e.g., via the gaming device 108, a communication device 144, etc.) of an available playstyle model when the gameplay data satisfies the set of criteria.

In an example, for a gameplay session associated with a player and the gaming device 108, the machine learning network may generate an output inclusive of probability information and confidence information corresponding to an identified playstyle model or a generated playstyle model and the applicability thereof to gameplay data (e.g., gameplay behavior) associated with a current gameplay session. The probability information may include a probability score (e.g., from 0.00 to 1.00) associated with a predicted parameter value(s). The confidence information may include a confidence score (e.g., from 0.00 to 1.00) corresponding to the probability score(s).

For example, the gaming server 116 (e.g., machine learning engine 141) may determine a probability score based on a correlation between gameplay behavior associated with a current gameplay session and gameplay behavior associated with a playstyle model. In some examples, the machine learning engine 141 may output a relatively low probability score for cases in which the machine learning engine 141 identifies a relatively low correlation (e.g., below a threshold) between the gameplay behaviors. In some other examples, the machine learning engine 141 may output a relatively high probability score for cases in which the machine learning engine 141 identifies a relatively high correlation (e.g., above a threshold) between the gameplay behaviors.

The machine learning engine 141 may support processing any combination of data associated with a gameplay session. For example, the machine learning engine 141 (e.g., using a playstyle model) may provide proposed gameplay decisions associated with decision events of a gameplay session. In an example, the proposed gameplay decisions may include proposed wager amounts, proposed gameplay selections (e.g., payline selection in a reel game, card draws associated with a card game, etc.), proposed selections of bonus prizes, etc.

For example, the machine learning engine 141 may propose the gameplay decisions in accordance with one or more playstyle models. In an example, the machine learning engine 141 may propose gameplay decisions that correspond to a learned playstyle model (e.g., corresponding to the player or another player) and/or a playstyle model associated with a playstyle behavior type (e.g., aggressive, conservative, etc.). Accordingly, for example, the machine learning engine 141 may provide an output inclusive of a proposed gameplay decision. In some examples, the machine learning engine 141 may provide an output inclusive of multiple proposed gameplay decisions corresponding to any combination of playstyle models. In some aspects, the machine learning engine 141 may output probability scores and/or confidence scores corresponding to proposed gameplay decisions.

The machine learning engine 141 may create, select, and execute appropriate processing decisions. Example processing decisions may include setting parameters (e.g., duration, playstyle model) of an auto play mode for a gaming device 108, invoking the auto play mode at the gaming device 108, modifying (e.g., extending, pausing, ending) the auto play mode of the gaming device 108, or the like. Other example processing decisions may include notifying a player of information associated with an auto play mode, such as, whether the auto play mode is available to the player, whether the auto play mode has been invoked, paused, and/or ended, temporal parameters (e.g., end time) associated with the auto play mode, playstyle models available for the auto play mode, playstyle models associated with the auto play mode, risk factors associated with available and/or applied playstyle models, etc. Processing decisions may be handled autonomously and/or semi-autonomously by the machine learning engine 141, with or without human input.

Data within the database of the memory 124 may be updated, revised, edited, or deleted by the machine learning engine 141. In some aspects, the machine learning engine 141 may support continuous, periodic, and/or batch fetching of data (e.g., from gaming devices 108, communication devices 144, databases, servers, etc.) and data aggregation.

Example Aspects and Implementations

Example aspects and implementations supported by the present disclosure are described herein with respect to generating playstyle models and incorporating the playstyle models in dynamic auto play modes.

The gaming system 100 may support configuration of a personal proxy to play a game on behalf of a player during a gameplay session at a gaming device 108. For example, the gaming system 100 may support a generated bot player which, when activated (e.g., in response to a player input), may play on behalf of the player. In an example, the bot player may implement gameplay decisions fully-autonomously or semi-autonomously based on player preferences and/or settings of the gaming device 108. In an example, the personal proxy may implement gameplay decisions and/or configure gameplay settings based on a playstyle model described herein.

For example, the gaming system 100 may support a smart auto play mode in which the gameplay decisions are implemented autonomously or semi-autonomously at a gaming device 108 based on a playstyle model. For example, a gaming device 108 may output a notification proposing (e.g., based on an output by the machine learning engine 141 and/or a data model(s) 142) a best gameplay decision associated with a gameplay session. In an example, the gameplay decision may correspond to a prompt for a selection during a bonus game (e.g., select 1 out of X choices).

In some examples, the gaming system 100 may support an auto play mode in which a gameplay session at a gaming device 108 is configured on behalf of a player, based on an applied playstyle model. In some cases, the configuration may be based on game type (e.g., video poker, slot machine, etc.). In some aspects, the gaming system 100 may support autonomous and/or semi-autonomous wager modifications (e.g., increases, decreases) at a gaming device 108 based on an applied playstyle model and a result associated with a gameplay decision (e.g., game outcome).

The gaming system 100 may be a central system linked with a casino establishment, a central system linked with a consortium of casino establishments, or the like. The gaming system 100 may support the aggregation, sharing, and exchange of data by devices (e.g., gaming devices 108, gaming servers 116, communication devices 144, databases, etc.) included in the gaming system 100.

For example, the gaming system 100 may be fed portions of gameplay data (e.g., gameplay decisions) associated with gameplay sessions at devices included in the gaming system 100, based on which the gaming server 116 may generate playstyle models described herein. For example, the playstyle models may include prediction profiles indicative of information such as "players who did this, also did that." Via gameplay data gathered and analyzed with respect to gameplay sessions, generated playstyle models may be distributed among devices (e.g., gaming devices 108, gaming servers 116, communication devices 144, etc.). For example, the generated playstyle models and associated prediction profiles and may be selectable/modifiable/implemented by a player for an auto play mode at a gaming device 108. In some aspects, the gaming system 100 may support player inputs associated with manually overwriting (e.g., modifying) any portion of model characteristics of the playstyle models generated by the gaming server 116. For example, the gaming system 100 may support viewing of generated and/or available playstyle models, selection of the playstyle models, and modification of pre-set model characteristics of the playstyle models.

In an example implementation, the gaming system 100 may support auto play configurations (e.g., auto play options). For example, the gaming system 100 may support playstyle models capable of implementing auto play functions corresponding to one or more playstyle models. In some cases, the playstyle models may be preset (e.g., preconfigured) and stored in a database (e.g., player profile database 148) of the gaming system 100. In some other cases, the playstyle models may include playstyle models generated by the gaming server 116 (e.g., machine learning engine 141) during a gameplay session.

In some aspects, when a player enables (e.g., via a user input) an auto play mode at a gaming device 108, the player may select a playstyle model (e.g., an entertainment playstyle model, a 'high roller' playstyle model, a 'jackpot hunter' playstyle model, etc.) for implementing the auto play mode. For example, based on a selected playstyle model, a gaming server 116 (or a gaming device 108) may autonomously and/or semi-autonomously implement decisions associated with a gameplay session. In an example, based on the selected playstyle model, the gaming server 116 (or the gaming device 108) may set or modify a wager amount, end a gameplay session (e.g., cash out) based on earned gameplay credits satisfying criteria (e.g., a cash out threshold) associated with the playstyle model and the gameplay session, select bonuses, etc.

In some other aspects, the gaming system 100 may support the switching of playstyle models during a gameplay session. For example, the gaming system 100 may support autonomous switching (e.g., implemented by the gaming server 116 and/or the gaming device 108) between playstyle models based on gameplay criteria such as temporal duration, credits earned, credits lost, winning streaks, losing streaks, etc. In some other aspects, the gaming system 100 may support temporary deactivation of auto play modes for portions of a gameplay session (e.g., player override for bonus events, prize selection, etc.).

In some aspects, the gaming system 100 may support temporary switching between playstyle models. In an example, the gaming system 100 may support switching between playstyle models based on a player input associated with a gameplay session. In another example, the gaming system 100 may support autonomous switching (e.g., implemented by the gaming server 116 and/or the gaming device 108) between playstyle models based on available gameplay credits at a gaming device 108 in association with a gameplay session. For example, the gaming server 116 may apply a first playstyle model in association with a first criteria (e.g., available credits exceeding a threshold) but apply a second playstyle model in association with a second criteria (e.g., available credits below a threshold).

In another example implementation, the gaming system 100 may support player adjustments and/or customizations to parameters associated with an auto play mode. In some aspects, the gaming system 100 may support player adjustments and/or customizations to parameters associated with a playstyle model. An example parameter may include an upper threshold associated with automatically triggering a cash out event at a gaming device 108 when the available credits at the gaming device 108 (e.g., in association with a credit meter) exceeds the threshold. Another example parameter may include a lower threshold associated with automatically triggering a cash out event at a gaming device 108 when the available credits at the gaming device 108 (e.g., in association with a credit meter) fall below the threshold.

Another example parameter may include a threshold associated with automatically triggering a cash out event at a gaming device 108 when an amount of credits earned in association with a gameplay decision exceeds the threshold (e.g., a 'big win' according to gameplay settings of a player). Some example criteria associated with triggering a cash out event for a gameplay session include temporal duration, credits earned, credits lost, net credits earned/lost compared to the credits available at the start of the gameplay session, winning streaks, losing streaks, etc. Other example parameters may support enabling/disabling of auto play modes for any portion of a gameplay session (e.g., player override for bonus events, prize selection, etc.).

Some other examples of parameter adjustments or customizations include: selection of paylines (e.g., lines on which a payout will be awarded), residual credit, adding paylines, reducing paylines, changing wager amounts, loading a payline (e.g., placing an entire bet amount on one payline), smart phone (mobile controller) integration with a gaming device 108, enabling/disabling speed play, enabling/disabling sounds or notifications based on gameplay result (e.g., muted for losses, unmuted for wins above a threshold), enabling sounds or notifications based on available credits (e.g., unmuted if below a threshold), win celebration, etc.

In another example implementation, the gaming system 100 may enable user activation of an auto play mode and user selection of a playstyle model based on whether a quantity of plays (e.g., number of spins) associated with a gameplay session is greater than or equal to a threshold quantity. In another example, the gaming system 100 may enable user activation of the auto play mode and/or user selection of a playstyle model based on whether a duration of a gameplay session is greater than or equal to a threshold duration. For example, the gaming server 116 may output a notification (e.g., via the gaming device 108, via a communication device 144) to the player indicating, "If you want to sit back and relax, I can continue auto-playing in the same manner that you have been playing." That is, for example, the gaming device 108 may output or display a notification that the auto play mode has been unlocked for the player (e.g., once the gaming server 116 and/or machine learning engine 141 has identified or generated a playstyle model that corresponds to gameplay behavior of the player).

In some cases, the gaming system 100 may support the identification of playstyle models for the auto play mode when the quantity of plays (e.g., number of spins) associated with a gameplay session is greater than or equal to a threshold quantity. In another example, the gaming system 100 may support the identification of playstyle models when the duration of a gameplay session is greater than or equal to a threshold duration. For example, after a quantity of plays is greater than or equal to a threshold quantity and/or a duration of a gameplay session is greater than or equal to a threshold duration, the gaming server 116 (e.g., machine learning engine 141) may identify a gameplay pattern corresponding to the gameplay session. The gaming server 116 (e.g., machine learning engine 141) may identify, from a set of available playstyle models, a playstyle model that corresponds to the gameplay pattern. Alternatively, or additionally, the gaming server 116 (e.g., machine learning engine 141) may generate a playstyle model that corresponds to the gameplay pattern.

In some aspects, the gaming server 116 (e.g., machine learning engine 141) may adjust or set the threshold quantity and/or the threshold duration associated with identifying and/or generating a playstyle model. For example, the gaming server 116 may increase or decrease the threshold quantity and/or the threshold duration in association with a player (e.g., a player profile). For example, based on the gameplay data, the gaming system 100 (e.g., machine learning engine 141) may identify whether more or less gameplay data is to be monitored for a player. In some cases, the gaming server 116 may enable player selection of an auto play mode when the amount of gameplay data satisfies a threshold (e.g., after a quantity of plays satisfies a threshold quantity for assigning a playstyle model).

In some aspects, the gaming system 100 may support gameplay suggestions based on a playstyle model (e.g., a generated playstyle model, a selected playstyle model, etc.). For example, when a playstyle model(s) is activated for a gameplay session at a gaming device 108, the gaming server 116 (e.g., the machine learning engine 141) may provide proposed gameplay decisions associated with decision events of the gameplay session. In an example, the proposed gameplay decisions may include proposed wager amounts, proposed gameplay selections (e.g., payline selection, card draws, etc.), proposed selections of bonus prizes, etc.

In some cases, the gaming server 116 may support proposed gameplay decisions as feature associated with a smart auto play mode. For example, the proposed gameplay decisions may correspond to a playstyle model associated with the player (e.g., a playstyle model corresponding to a player profile). In an example, the playstyle model may emulate gameplay behavior of the player such that the gaming device 108 (or communication device 144) implements gameplay decisions as the player, following gameplay patterns (e.g., gameplay behavior, playstyle) of the player.

In some cases, the gaming server 116 may output (e.g., via a gaming device 108, a communication device 144, etc.) a notification that interrupts or pauses the gameplay session at a gaming device 108 when the playstyle model identifies that the player (e.g., a novice player) is about to make an unfavorable gameplay decision (e.g., a gameplay decision unfavorable to the player, a decision that is unlikely for new players). In some aspects, the notification may include a proposed alternative gameplay decision.

As described herein, the gaming server 116 (e.g., machine learning engine 141) may monitor or watch a player, learning from gameplay decisions made by the player. Alternatively, or additionally, the gaming server 116 may support self-learning (e.g., forward learning) based on gameplay decisions made by the machine learning engine 141.

In another example implementation, the gaming system 100 may support different playstyle models available for the same player based on game type. In some aspects, the gaming system 100 may support the application of playstyle models across different game types. For example, playstyle models from one game may be used to select playstyle models for other games (e.g., entertainment type models, strategic models, etc.).

In an example, the gaming system 100 may support multiple gameplay profiles accessible by a player for each game style or game type. In some aspects, the gaming system 100 may support the grouping of similar games (e.g., based on game style or game type) to use the same gameplay profile. In an example, the gaming system 100 may support player selection of a gameplay profile, based on which the gaming server 116 may apply a playstyle model (corresponding to the gameplay profile) to a gameplay session. In some examples, games implemented at a gaming device 108 (e.g., mechanical, free spins 5-reel, picture-and-picture (PAP), keno, poker, etc.) may each have a different agent for a given user and may be applied depending on game type at the gaming device 108.

In some cases, the gaming system 100 may support linking playstyle models to a player based on a player account (e.g., a player identification). For example, when a player "cards in" to a gaming device 108 (e.g., using a player club card, a mobile application on a communication device 144, etc.), the gaming server 116 may enable use of the playstyle models for a gameplay session at the gaming device 108.

In some aspects, the gaming server 116 (e.g., the machine learning engine 141) may monitor gameplay at the gaming device 108 and identify a playstyle (e.g., gameplay behavior) of the player. For example, the gaming server 116 may continuously or periodically monitor the gameplay at the gaming device 108. In an example, the gaming server 116 may provide gameplay data to the machine learning engine 141 after a threshold quantity of gameplay decisions (e.g., 20 plays, 20 spins, etc.) has been met. Based on the gameplay data, the gaming server 116 (e.g., the machine learning engine 141) may identify the playstyle of the player, and auto-assign the best fitting playstyle model for auto play of the current gameplay session (e.g., based on a comparison of the playstyle to that of available playstyle models, based on a newly generated playstyle model corresponding to the playstyle, etc.). In an example, the gaming server 116 may output a notification (e.g., via a user interface of the gaming device and/or the communication device 144) indicating, "Smart auto play is now available—you may activate it by hitting the smart auto play button."

In some examples, the gaming system 100 may support a single playstyle model for each game type. For example, when the player initiates a gameplay session associated with a game type (e.g., video poker, keno, etc.), the gaming server 116 (or the gaming device 108 or the communication device 144) may auto-execute a respective playstyle model corresponding to the same game type.

In some aspects, the gaming server 116 may identify a playstyle (e.g., gameplay behavior) of a player based on gameplay associated with multiple gaming devices 108 and/or multiple game types (e.g., poker, keno, 5-reel, etc.). In an example, the gaming server 116 may identify from a player's gameplay behavior at gaming devices 108 of a first game type (e.g., poker) that the player has an aggressive playstyle. When the player "cards in" to a gaming device 108 of a second game type (e.g., 5-reel), the gaming server 116 may offer an auto play mode corresponding to an aggressive playstyle.

In another example implementation, the gaming system 100 may support the storage of playstyle models to a communication device 144 or other device (e.g., a portable memory device) of a player. In an example, the gaming system 100 may support applying any of the playstyle models to a gameplay session at a gaming device 108 based on data exchange or data sharing of the playstyle models. For example, the gaming server 116 (or gaming device 108) may detect and/or access playstyle models stored at a memory a communication device 144 based on a "card in" event at the gaming device 108 using the mobile application. In another example, the gaming server 116 (or gaming device 108) may detect and/or access playstyle models stored at the other device based on an insertion of the other device into the gaming device 108, establishment of a wired connection or wireless connection (e.g., NFC data exchange, etc.) between the other device and the gaming device 108, etc.

In an example, the playstyle models may remain on a communication device 144 (or other device of the player) and be accessible by the gaming system 100, rather than being stored on the gaming server 116. For example, the communication device 144 (e.g., via the mobile application) may enable access by the gaming server 116 to a playstyle model stored on the communication device 144, based on a player selection of a playstyle model.

Alternatively, or additionally, the communication device 144 may include a machine learning engine capable of implementing the stored playstyle models. For example, the communication device 144 may include a machine learning engine that includes aspects of the machine learning engine 141 described herein. The machine learning engine of the communication device 144 (and playstyle models stored at a memory of the communication device 144) may provide automated player inputs and or propose gameplay decisions as described herein. In an example, the communication device 144 may output decision data associated with the automated player inputs and or proposed gameplay decisions to the gaming device 108. The gaming device 108 may implement the player inputs and/or gameplay decisions based on the decision data from the communication device 144.

The mobile application may support the viewing, creation, and/or configuration of playstyle models by a player. For example, the mobile application may support the configuration of new auto play models (e.g., define characteristics, connect to gaming device 108, execute). In some aspects, the mobile application may support player selection of a playstyle model and applying the playstyle model to a gameplay session.

In an example, the mobile application may support reviewing characteristics or "personalities" associated with each playstyle model. For example, the mobile application may support assignment (e.g., by a player) of identification information such as names, avatars, images, etc. to the playstyle models. In some other aspects, the mobile application may support viewing, creation, and/or configuration of characteristic data corresponding to the playstyle models.

In some cases, the characteristic data may include textual data input by a player with respect to a playstyle model. For example, the textual data input by a player may include player notes regarding use, gameplay preferences, etc. of a playstyle model.

In some other cases, the characteristic data may include usage data and/or performance data of with respect to a playstyle model, provided by the gaming server 116, the gaming device 108, and/or a communication device 144. For example, the usage data may include temporal information and/or usage information (e.g., dates/times a playstyle model was used, how often a playstyle model has been used within a temporal period, game types for which a playstyle model has been applied) associated with each playstyle model.

The performance data of a playstyle model may correspond to previous gameplay sessions. In an example, the performance data may include win/loss information associated with a playstyle model. In some cases, the win/loss information may be with respect to game type, with respect to gaming device 108 (e.g., a favorite gaming device 108 of the player), etc. Aspects of the present disclosure may support updating playstyle models based on gameplay associated with a current gameplay session. For example, the gaming system 100 may support updating of the playstyle models in real-time according to gameplay associated with a current gameplay session. In another example, the gaming system 100 may support updating of the playstyle models at the completion of a current gameplay session.

Aspects of the mobile application described herein may be implemented at a gaming device 108. For example, after a "card in" event using a communication device 144 or other device of a player, the player may view, create, configure, select, and/or apply playstyle models as described herein, via a user interface of the gaming device 108.

In another example implementation, the gaming system 100 may support playstyle models corresponding to gameplay behavior and/or personality of users different from the player. For example, the gaming system 100 may support playstyle models corresponding to gameplay behavior and/or personality of a celebrity (e.g., a television personality, an athlete, a musician, etc.). In some examples, the playstyle models may correspond to successful players at a casino (e.g., a high score keeper at a casino venue associated with the gaming system 100, a famous/successful gambler who frequently visits the casino venue, a high-ranked player on a leaderboard, etc.).

In an example, the gaming system 100 may support generating and training a playstyle model based on gameplay behavior of the celebrity. In some aspects, the gaming system 100 may support generating and training the playstyle model (e.g., using model generation and training techniques described herein) based on gameplay decisions and/or gameplay behavior of the celebrity recorded, for example, at the gaming server 116, a gaming device 108, and/or a communication device 144 of the celebrity. In an example, the gaming system 100 may support playstyle models capable of emulating (e.g., as close as possible with respect to a threshold) gameplay decisions and gameplay behavior of the celebrity.

The gaming server 116 may display (e.g., at a user interface of a gaming device 108 and/or a communication device 144) a "Smart Auto Play Menu" inclusive of visualizations of different available auto play modes and playstyle models associated with any number of celebrities. For example, for a playstyle model corresponding to a celebrity, the "Smart Auto Play Menu" may include identification information (e.g., an image, textual description, an avatar, etc.) associated with the celebrity, a description of gameplay behavior or playstyle corresponding to the celebrity, a volatility graph of gameplay behavior corresponding to the celebrity, usage data of the playstyle model corresponding to the celebrity (e.g., frequency in which other players have selected the playstyle model), etc.

The examples described herein with respect to a celebrity may be applied to a successful player at a casino. For example, the gaming system 100 may support generation and training of "SUPER PLAY" models. In an example, the "SUPER PLAY" models may be playstyle models corresponding to relatively high-ranked players on a leaderboard. The gaming server 116 may display (e.g., at a user interface of a gaming device 108 and/or a communication device 144), in the "Smart Auto Play Menu," visualizations of different available auto play modes and playstyle models associated with any number successful players.

In another example implementation, the gaming system 100 may support auto play modes in which, during a gameplay session at a gaming device 108, the gaming device 108 may display proposed gameplay decisions corresponding to multiple playstyle models. For example, the gaming device 108 (or communication device 144) may display visual representations of other players during the gameplay session. In an example, the gaming device 108 may display proposed gameplay decisions corresponding to gameplay behaviors of other players.

For example, the gaming device 108 may display proposed gameplay decisions that correspond to a playstyle model different from that of the player at the gaming device 108 (e.g., the gaming device 108 may display proposed gameplay decisions that correspond to a playstyle model of a top performing player). In some aspects, the gaming device 108 may display "ghosts" (e.g., virtual representations) of other players and an indication of gameplay decisions of the other players in the same situation (e.g., a decision event) as the player. In some aspects, the gaming device 108 may display the indication of the gameplay decisions at user interface of the gaming device 108 (e.g., in a mini-display, a PAP, a picture-in-picture (PIP), etc.). In an example, the gaming device 108 may display the indication of the gameplay decisions at a choice screen (e.g., a decision event) associated with a skill-based game.

The gaming system 100 may support multiple games to be played on a gaming device 108 at the same time. For example, the gaming system 100 may support auto play modes in which the multiple games are respectively played at a gaming device 108 using multiple playstyle models (e.g., different playstyle models). In an example, a gaming device 108 may include a user interface (e.g., a single display) or multiple user interfaces (e.g., multiple displays) via which the multiple games are viewable.

For example, multiple games may be active simultaneously at a gaming device 108. The gaming system 100 may support, at the gaming device 108, gameplay decisions provided by an auto play mode (e.g., based on a playstyle model) in association with a first game, gameplay decisions provided by the auto play mode (e.g., based on the same playstyle model or a different playstyle model) in association with a second game, and/or manual gameplay decisions entered by a player in association with a third game. In an example, the auto play mode may provide and implement gameplay decisions for the first and second games based on corresponding playstyle models, while the player may make gameplay decisions for the third game.

The gaming system 100 may provide auto play modes supportive of semi-autonomous gameplay. For example, during a gameplay session at a gaming device 108, the gaming device 108 may display avatars corresponding to different playstyle models. In an example, the gaming device 108 may display an avatar (e.g., an angel) in association with a relatively conservative (e.g., risk-aware) playstyle model and display a different avatar (e.g., a devil) in association with a relatively risky playstyle model. In some cases, the gaming device 108 may display the avatars in combination with proposed gameplay decisions associated with each avatar (e.g., each playstyle model). In an example, the gaming device 108 may display the avatars during the entirety of a gameplay session or at some decision events (e.g., bonus events) of the gameplay session.

In some aspects, the gaming system 100 may support player selection of a proposed gameplay decisions or a different gameplay decision (e.g., the player's own decision). In some other aspects, the gaming system 100 may support player selection of any combination of proposed gameplay decisions and a player's own gameplay decision. In an example, the player may select a proposed decision corresponding to the angel (e.g., risk-aware playstyle model), a proposed decision corresponding to the devil (e.g., risky playstyle model), and/or provide the player's own gameplay decision. In some aspects, player selection of multiple gameplay decisions may incur additional wager amounts to cover the multiple gameplay decisions.

In another example implementation, the gaming system 100 may support providing (e.g., by the gaming server 116) notifications indicating predicted gameplay parameters associated with a playstyle model applied to an auto play mode. In an example, the predicted gameplay parameters may include a predicted gameplay duration (e.g., amount of time until gameplay credits are exhausted) associated with the playstyle model, a predicted risk factor (e.g., risk level) associated with the playstyle model, average gameplay credits spent over a time period when applying the playstyle model, and/or a recommendation of how much money to insert to secure a desired amount of time at a gaming device 108.

In an example, the gaming server 116 may provide a set of different playstyle models to a player in association with a gameplay session. Each playstyle model may be associated with its own characteristics (e.g., "spend as much as possible to win as big as possible" or "low spender to increase time on device"). In an example, for each selectable playstyle model at a gaming device 108, the gaming device 108 may display the "average time on device" based on the available gameplay credits (e.g., cash amount) on the credit meter of the gaming device 108.

Accordingly, for example, the gaming server 116 may support selectable playstyle models corresponding to estimated gameplay durations (e.g., durations preferable by a player). For example, the gaming device 108 may output proposed gameplay decisions based on a selected playstyle model, and the gaming device 108 may display an estimated gameplay duration that may be achievable at the gaming device 108 if the proposed gameplay decisions are selected by the user. In another example, based on a selected playstyle model, the gaming server 116 may implement gameplay decisions at the gaming device 108 up to a corresponding estimated gameplay duration (e.g., the playstyle model may play on the player's behalf while the player watches, and the estimated gameplay duration may be reached by watching the model play).

In some aspects, the predicted gameplay parameters (e.g., estimated gameplay duration) associated with a playstyle model may be supportive of responsible gaming actions within a casino environment. For example, the predicted gameplay parameters may provide a player with insight into the volatility of the player's gameplay behavior.

In another example implementation, the gaming system 100 may support autonomous and/or semi-autonomous wager modifications (e.g., increases, decreases) at a gaming device 108 based on an applied playstyle model and a result associated with a gameplay decision (e.g., game outcome). For example, the gaming system 100 may support a playstyle-based "Bet" button at a gaming device 108 (e.g., on a digital button panel). In some aspects, the gaming system 100 may support player selection of a playstyle model to be applied to the playstyle-based "Bet" button.

In an example, gameplay behavior associated with the playstyle model may be applied to a gameplay session at each instance of selecting the playstyle-based "Bet" button. In an example, consecutive or semi-consecutive selection of the playstyle-based "Bet" button may automatically adjust bet behavior (e.g., a wager amount) in accordance with the corresponding playstyle model when a threshold quantity of plays (e.g., spins) is reached. Accordingly, for example, consecutive or semi-consecutive selection of the playstyle-based "Bet" button may automatically apply a wager amount, a betting decision, etc. based on the playstyle model.

For example, betting behavior of a selected playstyle model applied to the playstyle-based "Bet" button may include 5 plays at a wager amount of $1, followed by 10 plays at $5, followed by 10 plays at $1, etc. With each press of the playstyle-based "Bet" button, the player may "play" a game according to the playstyle model. In an example, the first 5 presses of the playstyle-based "Bet" button may result in a play at a wager amount of $1, the next 10 presses of the playstyle-based "Bet" button may result in a play at a wager amount of $5, and so on. Accordingly, for example, the playstyle-based "Bet" button may function as a smart "Repeat Bet" button at a gaming device 108.

In an example, the player may select a playstyle out of a given number of different playstyle models, each associated with gameplay session characteristics (e.g., level of risk, behavior in situation A/B/C, bet volatility, gameplay session goals, etc.). The gaming server 116 (e.g., gaming device 108) may dynamically change the wager amounts associated with playstyle-based "Bet" button, for each bet, based on the playstyle model. In an example of wager amounts based on a playstyle model, Spin 1 corresponds to a wager amount of 50 credits; Spin 2 corresponds to a wager amount of 50 credits; Spin 3 corresponds to a wager amount of 150 credits, Spin 4 corresponds to a wager amount of 50 credits, etc.). At each instance of pressing the playstyle-based "Bet" button, a player confirms that he/she "accepts" the gameplay behavior associated with the playstyle model. In some aspects, the gaming system 100 may support player inputs which alternate between selecting the playstyle-based "Bet" button or a "regular" spin button (e.g., according to a player preferred wager amount and/or gameplay decision).

In some aspects, the gaming system 100 may support player activation of the playstyle-based "Bet" button during a gameplay session. For example, the gaming system 100 may support player activation of the playstyle-based "Bet" button in accordance with a dynamic auto play mode as described herein.

Aspects of the present disclosure may be applied to game types other than those associated with gaming devices 108. For example, the gaming system 100 may support application of the auto play modes and playstyle models described herein to a sports betting environment. In some aspects, the gaming server 116 (e.g., machine learning engine 141) may support processing any combination of data associated with a sporting event (e.g., athlete performance, athlete performance statistics, team performance, team statistics, previous game results, etc.) and player decisions (e.g., wager amounts, wager parameters, etc.) associated with the sporting event. The gaming server 116 may generate any number of playstyle models corresponding to player decisions in relation to a sporting event. In some cases, the gaming system 100 may support proposed gameplay decisions associated with sports wagers such as micro events (e.g., micro-betting).

Figure 2:
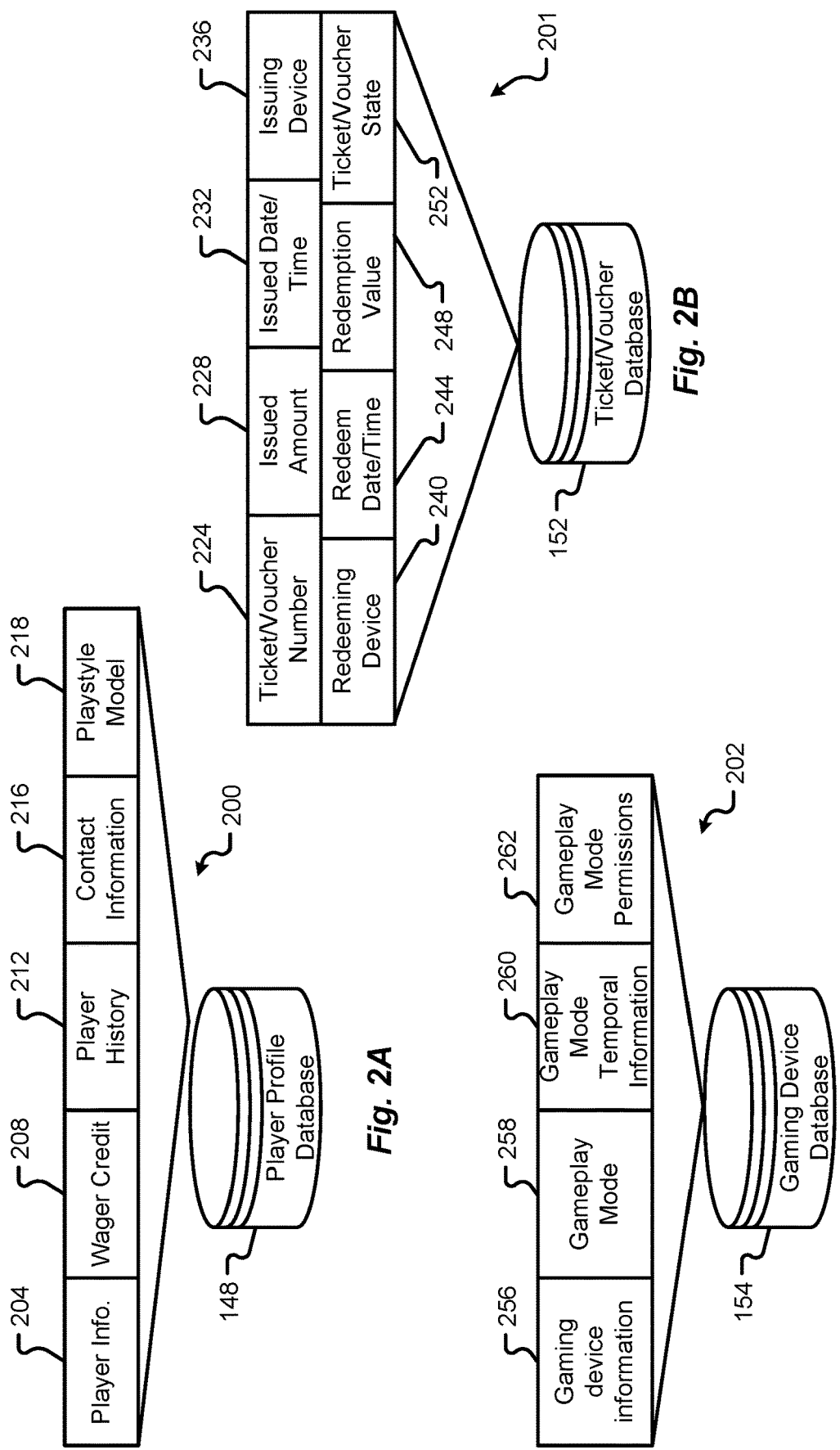
FIG. 2A is a block diagram illustrating a first example data structure used in accordance with aspects of the present disclosure.
FIG. 2B is a block diagram illustrating a second example data structure used in accordance with aspects of the present disclosure.
FIG. 2C is a block diagram illustrating a third example data structure used in accordance with aspects of the present disclosure.

With reference now to FIGS. 2A through 2C, additional details of data structures that are useable in connection with managing auto play modes and playstyle models at a gaming device will be described in accordance with at least some embodiments of the present disclosure. It should be appreciated that the data structures depicted and described herein may be stored within a central database or may be distributed among a number of data storage nodes. Alternatively or additionally, some or all of the fields of the data structures may be maintained in devices of the gaming system 100 such as the gaming server 116, a gaming device 108, and/or a communication device 144 without departing from the scope of the present disclosure.

With reference initially to FIG. 2A, details of a data structure 200 that may be maintained as part of a player profile will be described in accordance with at least some embodiments of the present disclosure. The database 148 may be configured to store one or multiple data structures 200 that are used in connection with tracking player progress and gaming history. In some embodiments, the data stored in the data structure 200 may be stored for a plurality of different player profiles or for a single player profile. As a non-limiting example, the data structure 200 may be used to store player loyalty information, player history information, and the like. Even more specifically, the data structure 200 may include a plurality of data fields that include, for instance, a player information field 204, a wager credit field 208, a player history field 212, a contact information field 216, and a playstyle model field 218.

The player information field 204 may be used to store any type of information that identifies a player or a group of players. In some embodiments, the player information field 204 may store one or more of username information for a player 112, password information for a player account, player status information, accommodations associated with the player 112, and any other type of customer service management data that may be stored with respect to a player 112.

The wager credit field 208 may be used to store data about the available credit of a player 112 with a device, with a sports book, with a casino, and/or with a plurality of casinos. For instance, the wager credit field 208 may store an electronic record of available credit in the player's account and whether any restrictions are associated with such credit. The wager credit field 208 may further store information describing a player's available credit over time, cash out events for the player, winning events for the player 112, wagers placed by the player 112, tickets/vouchers issued to the player 112, and the like.

The player history field 212 may be used to store historical data for events that occur with respect to the player 112. For example, the player history field 212 may store information associated with the player 112 in relation to an outcome in a game of chance, an outcome in a game of skill, a celebration event for a person other than the player 112, involvement in a celebration event, visits to a predetermined location, gameplay information with respect to a particular game, player interactions with a communication device 144, player interactions (e.g., gameplay decisions) with a gaming device 108, wagers placed by the player 112, tickets/vouchers issued for the player 112, tickets/vouchers redeemed by the player 112, etc.

In some other examples, the player history field 212 may store user decisions by the player 112 in relation to instances of setting parameters of an auto play mode for a gaming device 108 (e.g., duration, quantity of plays, a cash-out threshold, whether the auto play mode is fully autonomous or semi-autonomous, etc.), invoking the auto play mode at the gaming device 108, pausing the auto play mode, bypassing the auto play mode (e.g., inputting a gameplay decision different from a proposed gameplay decision, refraining from pressing the playstyle-based "Bet" button described herein, etc.), and/or terminating the auto play mode.

The contact information field 216 may store information associated with a preferred mode(s) of contact for the player 112 and how such contact can be made. For instance, the contact information field 216 may store information such as an email address, phone number, room number, player loyalty number, address, etc.

The playstyle model field 218 may store user decisions by the player 112 in relation to instances of selecting playstyle models for an auto play mode. In some aspects, for a player profile corresponding to the player 112, the playstyle model field 218 may include a list of playstyle models associated with the player profile. For example, the playstyle model field 218 may include a list of stored playstyle models (e.g., stored at the memory 124 of the gaming server 116, stored at the player profile database 148, stored at the gaming device database 154, etc.). In some examples, for a playstyle model stored at a communication device 144 of the player 112, the playstyle model field 218 may include identifying information associated with the playstyle model, without the model data included in the playstyle model.

With reference now to FIG. 2B, details of another data structure 201 that may be used within the gaming system 100 will be described in accordance with at least some embodiments of the present disclosure. The database 152 may be configured to store one or multiple data structures 201 that are used in connection with tracking ticket/voucher status, value, and the like. In some cases, the data structures 201 may be used in connection with tracking credits associated with a gameplay session at a gaming device 108. In some other cases, the data structures 201 may be used in connection with tracking credits earned and/or credits lost at a gaming device 108 in association with an invoked auto play mode, a playstyle model applied to the auto play mode, etc.

In some embodiments, the data stored in the data structure 201 may be stored for a plurality of different tickets/vouchers and may or may not be organized based on events, player association, etc. As a non-limiting example, the data structure 201 may be used to store ticket/voucher status information, ticket/voucher value information, and the like. The ticket/voucher value information may include credit information associated with a gameplay session at a gaming device 108.

In an example, the data structure 201 may include a plurality of data fields that include, for instance, a ticket/voucher number field 224, an issued amount field 228, an issued date/time field 232, an issuing device field 236, a redeeming device field 240, a redeem date/time field 244, a redemption value field 248, and a ticket/voucher state field

252. It should be appreciated that the data structure 201 may have greater or fewer fields than depicted in FIG. 2B.

The ticket/voucher number field 224 may be used to store a unique validation number assigned to the ticket/voucher when a ticket/voucher is issued to a player 112. In some embodiments, the data stored in the ticket/voucher number field 224 may be randomly generated, pseudo-randomly generated, or sequentially generated based on when the ticket/voucher is issued. In some embodiments, the validation number assigned to the ticket/voucher may be unique to the ticket/voucher within the gaming system 100 (e.g., at least unique as to any other ticket/voucher issued within the gaming system 100). While numeric values may be used for the validation number, it should be appreciated that any alphanumeric string may be used for the validation number stored in the ticket/voucher number field 224.

The issued amount field 228 may be used to store an electronic record of a monetary value for which the particular ticket/voucher was issued. The issued amount field 228 may correspond to a data field that is written once and not updated. Thus, even when an associated ticket/voucher transitions from the issued state to another state, the value recorded in the issued amount field 228 may be left unchanged. Likewise, the information stored in the issued date/time field 232 and issuing device field 236 may also be written once and not changed thereafter. The issued date/time field 232 may store information describing when a ticket/voucher is issued, whereas the issuing device field 236 may store information describing where a ticket/voucher is issued. For instance, the issuing device field 236 may indicate a unique serial number assigned to a gaming device 108 that was used to issue the ticket/voucher to the player 112 and the issued date/time field 232 may store the time at which the ticket/voucher was issued by the gaming server 116 and/or the gaming device 108.

In some embodiments, the date/time field 232 may be populated based on a clock of the gaming device 108 that issued the ticket/voucher rather than relying on the clock of the gaming server 116. Said another way, when a gaming device 108 issues a ticket/voucher, such information may be communicated back to the gaming server 116 along with a timestamp provided by the gaming device 108 to indicate a time at which the gaming device 108 issued the ticket/voucher. Using the time indicated by the gaming device 108 can help account for or avoid problems associated with delays in communication over the communication network 104. One such possible problem would be having a wagered event (e.g., a sporting event) come to completion while the communication network 104 is down or unavailable and before the gaming server 116 becomes aware of an issued ticket/voucher by a gaming device 108. Alternatively, or additionally, it may also be possible or desirable to use the clock of the gaming server 116 as the centralized authority on all date/times entered into the field 232, thereby avoiding the need to synchronize or consider synchronization issues between different gaming devices 108.

Like the issuing device field 236, the redeeming device field 240 may be used to store information describing a device at which a ticket/voucher is redeemed by a player 112. Alternatively, or additionally, the redeeming device field 240 may be used to store information describing a communication device 144 via which a player 112 may redeem credits associated with a gameplay session or a player profile. In some embodiments, a device used for redeeming a ticket/voucher or credits may correspond to a gaming device 108 or a communication device 144.

A player 112 may redeem a ticket/voucher at a gaming device 108 by inserting a printed ticket/voucher into a ticket acceptance device of the gaming device 108 (e.g., similar to a bill acceptor). A player 112 may redeem a ticket/voucher at a communication device 144 by scanning the ticket/voucher with a camera of the communication device 144 and transmitting information obtained from the scan of the ticket/voucher back to the gaming server 116 as proof of redemption. Alternatively, or additionally, in the example case of an electronic ticket/voucher (e.g., an e-TITO voucher), a player 112 may to redeem the electronic ticket/voucher at a gaming device 108 or a communication device 144 by using an RFID reader that is in electronic communication with (e.g., electrically coupled to) the gaming device 108 or the communication device 144.

Thus, the redeeming device field 240 may store information uniquely describing the device used by the player 112 to redeem a ticket/voucher (e.g., an address or device ID). Alternatively or additionally, the redeeming device field 240 may store information describing a type of device that was used for redemption (e.g., whether the device is a gaming device 108 or a communication device 144).

The redemption date/time field 244, similar to the issued date/time field 232, may be used to store data and/or time information for the ticket/voucher. For example, the redemption date/time field 244 may be used to store a date/time when a ticket/voucher is redeemed as opposed to when the ticket is issued. Again, the time indicated in the field 244 may be based on a timestamp issued by the redeeming device and/or a clock of the gaming server 116. The date/time provided in the data field 244 may correlate to a date/time when the state of the ticket transitions within the ticket/voucher state field 252.

When the electronic record of the ticket/voucher state 252 is updated, a change to the date/time in field 244 may also be made at substantially the same time. As will be discussed in further detail herein, the ticket/voucher state field 252 may be used to store state or status information for a ticket/voucher and the state within the field 252 may be capable of having at least three different values (e.g., issued, redeemable, and redeemed). Other possible values for the state of the ticket/voucher may include, without limitation, a pending state, which may correspond to a state between the issued state and the redeemable state where a wagered event has come to completion but the redeemable value of the ticket/voucher is still being determined and/or considered.

The redemption value field 248 may be used to store an electronic record indicating an amount for which a ticket/voucher may be redeemed (e.g., a redeemable value) and/or an amount for which a ticket/voucher is actually redeemed (e.g., a redeemed/redemption amount). In embodiments where the redeemable value is the same as the redeemed/redemption value, there may only need to be a single data field 248 to store the redemption value for the ticket/voucher. In some embodiments, it may also be desirable to have separate data fields to store a redeemable value for a ticket/voucher and then a redeemed/redemption value for the ticket/voucher. The redeemable value for a ticket/voucher may be determined by the gaming server 116 as soon as the wagered event for which the ticket/voucher is associated has come to completion whereas the redemption value may be determined by the gaming server 116 when the ticket/voucher is redeemed. Again, the redemption value may be the same as or different from the redeemable value without departing from the scope of the present disclosure.

With reference to FIG. 2C, details of a data structure 202 that may be maintained as part of a gaming device profile will be described in accordance with at least some embodiments of the present disclosure. The gaming device database 154 may be configured to store one or multiple data structures 202 that are used in connection with tracking a gameplay mode of a gaming device 108. In some embodiments, the data stored in the data structure 202 may be stored for a plurality of different gaming devices 108 or a single gaming device 108. As a non-limiting example, the data structure 202 may be used to store gaming device information, gameplay play mode information, and the like. Even more specifically, the data structure 202 may include a plurality of data fields that include, for instance, a gaming device information field 256, a gameplay mode field 258, a gameplay mode temporal information field 260, and a gameplay mode permissions field 262.

The gaming device information field 256 may be used to store any type of information that identifies a gaming device 108 or a group of gaming devices 108. In some embodiments, the gaming device information field 256 may store identification information for a gaming device 108 (e.g., a unique serial number assigned to the gaming device 108) and any other type of gaming device management data that may be stored with respect to a gaming device 108.

The gameplay mode field 258 may be used to store any type of information associated with a gameplay mode (e.g., an auto play mode) of a gaming device 108 or a group of gaming devices 108. In some embodiments, the gameplay mode field 258 may store information indicating whether a gaming device 108 is in a fully-autonomous auto play mode or a semi-autonomous auto play mode. In some examples, the gameplay mode field 258 may store information indicating playstyle models associated with an auto play mode. For example, the gameplay mode field 258 may store information indicating playstyle models available for an auto play mode, an active playstyle model associated with an auto play mode, etc.

The gameplay mode temporal information field 260 may store date/time information describing when a gameplay mode (e.g., an auto play mode) is invoked at a gaming device 108. In some aspects, the gameplay mode temporal information field 260 may store information describing a duration (e.g., an initially set duration, an extended duration, a remaining duration) associated with an auto play mode invoked at the gaming device 108. In an example, the gameplay mode temporal information field 260 may store a time associated with disabling the auto play mode at the gaming device 108. In some aspects, the gameplay mode temporal information field 260 may include time periods during which auto play mode may be made available (e.g., as set by a casino) to a player.

The gameplay mode permissions field 262 may store permissions information describing whether a gameplay mode (e.g., an auto play mode) may be invoked at a gaming device 108. For example, the gameplay mode permissions field 262 may store permissions information describing whether a player may invoke an auto play mode at the gaming device 108. In an example, the permissions information may indicate whether invoking the auto play mode is available to players satisfying a membership status (e.g., player club status) or higher or whether invoking the auto play mode is regardless of membership status (e.g., available to any player). In another example, the permissions information may indicate whether invoking the auto play mode is available as a free feature to all players or as a paid feature (e.g., fee-based). In some other examples, the permissions information may indicate whether invoking the auto play mode is available when a player satisfies a set of gameplay criteria (e.g., a threshold quantity of plays, a threshold duration of gameplay, etc.).

In some cases, the permissions information may indicate playstyle model availability according to player identification information, player membership status, paid feature criteria, sharing permissions (e.g., sharing permissions between players, sharing permissions granted by a player), etc. For example, the gaming system 100 may support the use of another player's playstyle model as a paid feature, as part of a reward system (e.g., player membership program), as part of a shared feature between players (e.g., based on sharing permissions, social media relationships, etc.).

Figure 3:
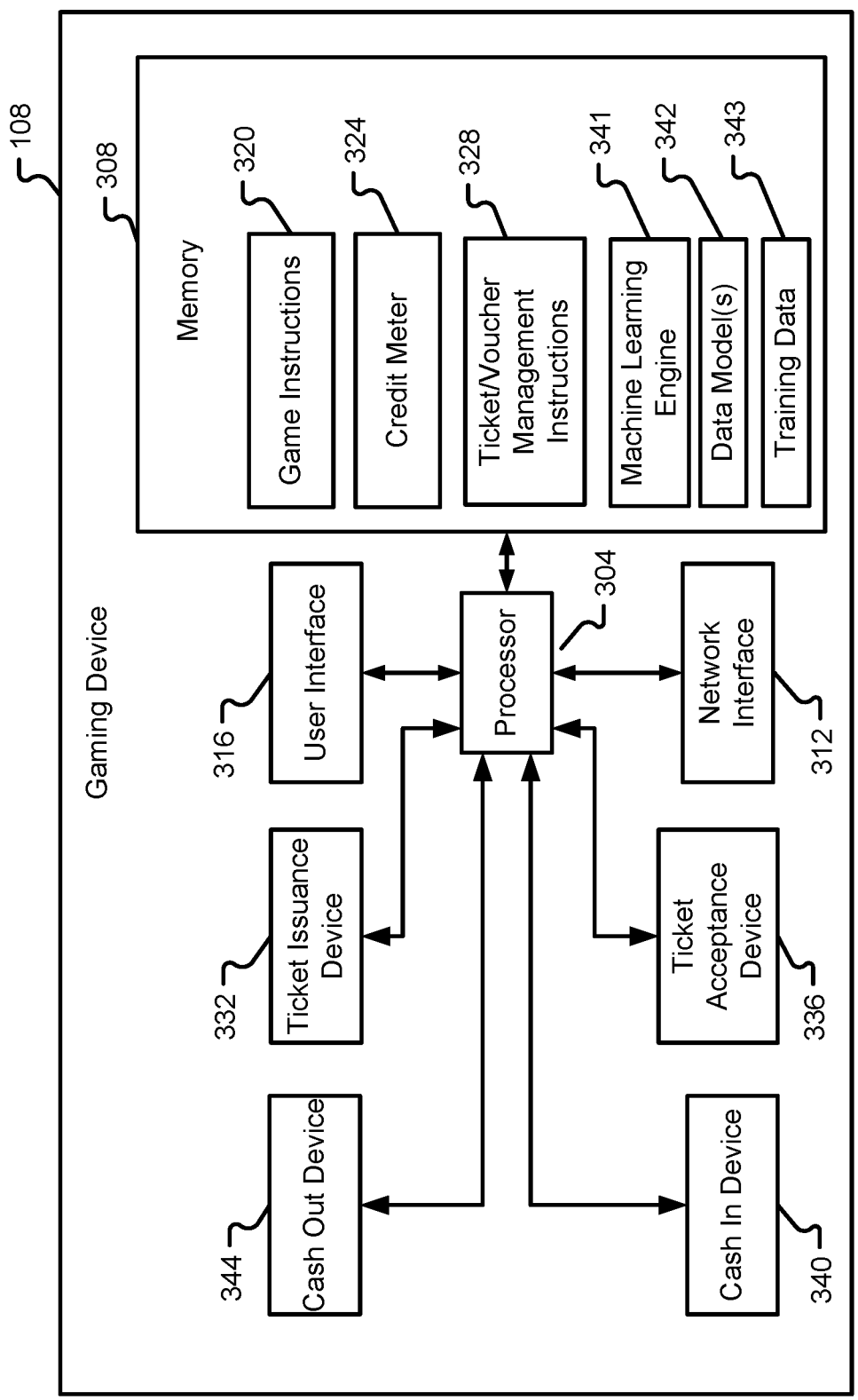
FIG. 3 is a block diagram of a gaming device in accordance with aspects of the present disclosure.

With reference now to FIG. 3, additional details of a gaming device 108 will be described in accordance with at least some embodiments of the present disclosure. While depicted as a gaming device 108, it should be appreciated that some or all of the components of the gaming device 108 may be included in a mobile device 144 described herein without departing from the scope of the present disclosure.

The gaming device 108 is depicted to include a processor 304, memory 308, a network interface 312, a user interface 316, a ticket issuance device 332, a ticket acceptance device 336, a cash-in device 340, and a cash out device 344. In some embodiments, the processor 304 may include example aspects of the processor 120. In other words, the processor 304 may correspond to one or many microprocessors, CPUs, microcontrollers, or the like. The processor 304 may be configured to execute one or more instruction sets stored in memory 308.

The network interface 312 may include example aspects of network interface 128. The nature of the network interface 312, however, may depend upon whether the network interface 312 is provided in a gaming device 108 or a communication device 144. Examples of a network interface 312 include, without limitation, an Ethernet port, a USB port, an RS-232 port, an RS-485 port, a NIC, an antenna, a driver circuit, a modulator/demodulator, etc. The network interface 312 may include one or multiple different network interfaces depending upon whether the gaming device 108 is connecting to a single communication network 104 or multiple different types of communication networks 104. For instance, the gaming device 108 may be provided with both a wired network interface and a wireless network interface without departing from the scope of the present disclosure.

The user interface 316 may correspond to any type of input and/or output device that enables the player 112 to interact with the gaming device 108. As can be appreciated, the nature of the user interface 316 may depend upon the nature of the gaming device 108. For instance, if the gaming device 108 is a traditional mechanical reel slot machine, then the user interface 316 may include one or more mechanical reels with symbols provided thereon, one or more lights or LED displays, one or more depressible buttons, a lever or "one armed bandit handle", a speaker, or combinations thereof. If the gaming device 108 is a digital device, then the user interface 316 may include one or more touch-sensitive displays, LED/LCD display screens, etc. In some cases, the user interface 316 may include a combination of a physical interface (e.g., mechanical reels, depressible buttons, a lever, etc.) and other user interfaces (e.g., touch-sensitive displays, LED/LCD display screens, etc.). In some cases, the user interface 316 may include a biometric scanning device (e.g., a fingerprint scanner) supportive of biometric inputs by a user.

In some examples, the user interface 316 may include an interface for implementing an auto play mode described herein. For example, the user interface 316 may support the selection of a playstyle model and the invoking of an auto play mode based on the playstyle model. In some other examples, the user interface 316 may support a playstyle-based "Bet" button described herein.

The memory 308 may include example aspects of memory 124. For instance, the memory 308 may include one or multiple computer memory devices that are volatile or non-volatile. The memory 308 may be configured to store instruction sets that enable player interaction with the gaming device 108, that enable game play at the gaming device 108, and/or that enable coordination with the gaming server 116. Examples of instruction sets that may be stored in the memory 308 include a game instruction set 320, a credit meter 324, and a ticket/voucher management instruction set 328.

In some embodiments, the game instruction set 320, when executed by the processor 304, may enable the gaming device 108 to facilitate one or more games of chance or skill and produce interactions between the player 112 and the game of chance or skill. In some embodiments, the game instruction set 320 may include subroutines that present one or more graphics to the player 112 via the user interface 316, subroutines that calculate whether a particular wager has resulted in a win or loss during the game of chance or skill, subroutines for determining payouts for the player 112 in the event of a win, subroutines for exchanging communications with a connected server (e.g., game management server, gaming server 116, or the like), subroutines for enabling the player 112 to engage in a game using their communication device 144, and any other subroutine or set of instructions that facilitate gameplay at or in association with the gaming device 108.

In some aspects, the game instruction set 320, when executed by the processor 304, may enable the gaming device 108 to facilitate interactions between the player in association with invoking an auto play mode of the gaming device 108. In an example, the game instruction set 320 may include subroutines that present, via the user interface 316, a menu or notifications associated with aspects described herein for setting and/or viewing parameters of an auto play mode for a gaming device 108, invoking the auto play mode at the gaming device 108, pausing the auto play mode, bypassing the auto play mode, and/or terminating the auto play mode. In some examples, the game instruction set 320 may include subroutines that present the menu or notifications via a communication device 144.

The credit meter 324 may correspond to a secure instruction set and/or data structure within the gaming device 108 that facilitates a tracking of activity at the gaming device 108. In some embodiments, the credit meter 324 may be used to store or log information related to various activities of a player 112 and events that occur at the gaming device 108. The types of information that may be maintained in the credit meter 324 include, without limitation, player information, available credit information, wager amount information, and other types of information that may or may not need to be recorded for purposes of accounting for wagers placed at the gaming device 108 and payouts made for a player 112 during a game of chance or skill played at the gaming device 108.

In some embodiments, the credit meter 324 may be configured to track coin in activity, coin out activity, coin drop activity, jackpot paid activity, bonus paid activity, credits applied activity, external bonus payout activity, ticket/voucher in activity, ticket/voucher out activity, timing of events that occur at the gaming device 108, and the like. In some embodiments, certain portions of the credit meter 324 may be updated in response to outcomes of a game of chance or skill played at the gaming device 108. In some embodiments, the credit meter 324 may be updated depending upon whether the gaming device 108 is issuing a ticket/voucher, being used as a point of redemption for a ticket/voucher, and/or any other activity associated with a ticket/voucher. Some or all of the data within the credit meter 324 may be reported to the gaming server 116, for example, if such data applies to a centrally-managed game and/or a status of a ticket/voucher. As an example, the number, value, and timing of wagers placed by a particular player 112 and payouts on such wagers may be reported to the gaming server 116.

Activities of the gaming device 108 related to ticket/voucher activity may be managed and reported by the ticket/voucher management instruction set 328. In some embodiments, when a ticket/voucher is redeemed at the gaming device 108 by the player 112, information associated with the ticket/voucher may be obtained by the ticket/voucher management instruction set 328 and reported to the gaming server 116. Furthermore, the ticket/voucher management instruction set 328 may be configured to update the credit meter 324 if the redeemed ticket/voucher is determined to be in a redeemable state and has a redeemable or redemption value associated therewith. In some embodiments, the credit meter 324 may be updated or incremented by the redeemable or redemption value of the ticket/voucher when redeemed. This information may be obtained directly from the ticket/voucher or may include some interactions (e.g., verification operations) with the gaming server 116 prior to updating the credit meter 324.

The gaming device 108 may be provided with appropriate hardware to facilitate acceptance and issuance of tickets/vouchers. Specifically, the gaming device 108 may be provided with a ticket acceptance device 336 that is configured to accept or scan physically-printed tickets/vouchers and extract appropriate information therefrom. In some embodiments, the ticket acceptance device 336 may include one or more machine vision devices (e.g., a camera, IR scanner, optical scanner, barcode scanner, etc.), a non-visual scanning device (e.g., an RFID reader, an NFC reader), a physical ticket acceptor, a shredder, etc. The ticket acceptance device 336 may be configured to accept physical tickets and/or electronic tickets without departing from the scope of the present disclosure. An electronic ticket/voucher may be accepted by scanning a visual code (e.g., a one-dimensional barcode, a two-dimensional barcode, any other type of barcode, a quick response (QR) code, etc.) displayed on a printed ticket/voucher or a communication device 144, for example. In another example, an electronic ticket/voucher may be accepted by scanning a tag (e.g., an RFID tag, an NFC tag, a contactless smart card, or the like) storing the ticket/voucher information.

The ticket issuance device 332 may be configured to print or provide physical tickets/vouchers to players 112. In some embodiments, the ticket issuance device 332 may be configured to issue a ticket/voucher consistent with an amount of credit available to a player 112, possibly as indicated within the credit meter 324. In some cases, the ticket/voucher may be an e-TITO voucher including a reprogrammable electronic display and an RFID tag.

The cash-in device 340 may include a bill acceptor, a coin acceptor, a chip acceptor or reader, or the like. In some embodiments, the cash-in device 340 may also include credit card reader hardware and/or software. In some aspects, the cash-in device 340 may include one or more machine vision devices (e.g., a camera, IR scanner, optical scanner, barcode scanner, etc.) or non-visual scanning devices (e.g., an RFID reader/writer, an NFC reader/writer).

The cash-out device 344, like the ticket issuance device 322, may operate and issue cash, coins, tokens, or chips based on an amount indicated within the credit meter 324. In some embodiments, the cash-out device 344 may include a coin tray or the like and counting hardware configured to count and distribute an appropriate amount of coins or tokens based on a player's 112 winnings or available credit within the credit meter 324. In some aspects, the cash-out device 344 may include one or more machine vision devices or non-visual scanning devices.

The memory 308 may be configured to store instruction sets, neural networks, and other data structures (e.g., depicted herein) in addition to temporarily storing data for the processor 304 to execute various types of routines or functions. For example, the memory 308 may be configured to store program instructions (instruction sets) that are executable by the processor 304 and provide functionality of a machine learning engine 341 described herein. The machine learning engine 341 may include example aspects of the machine learning engine 141 described with reference to FIG. 1.

One example of data that may be stored in memory 308 for use by components thereof is a data model(s) 342 and/or training data 343. The data model(s) 342 and the training data 343 may include examples of aspects of the data model(s) 142 and the training data 143 described with reference to the gaming server 116. The gaming device 108 (e.g., the machine learning engine 341) may utilize one or more data models 342 for recognizing and processing information obtained by the gaming device 108, another gaming device 108, a server (e.g., the gaming server 116), communication devices 144, and/or a database (e.g., player profile database 148, ticket/voucher database 152, and/or gaming device database 154). In some aspects, the gaming device 108 (e.g., the machine learning engine 341) may update one or more data models 342 based on learned information included in the training data 343.

In some aspects, components of the machine learning engine 341 may be provided in a separate machine learning engine (e.g., at server, for example, the gaming server 116) in communication with the gaming device 108.

Figure 4:
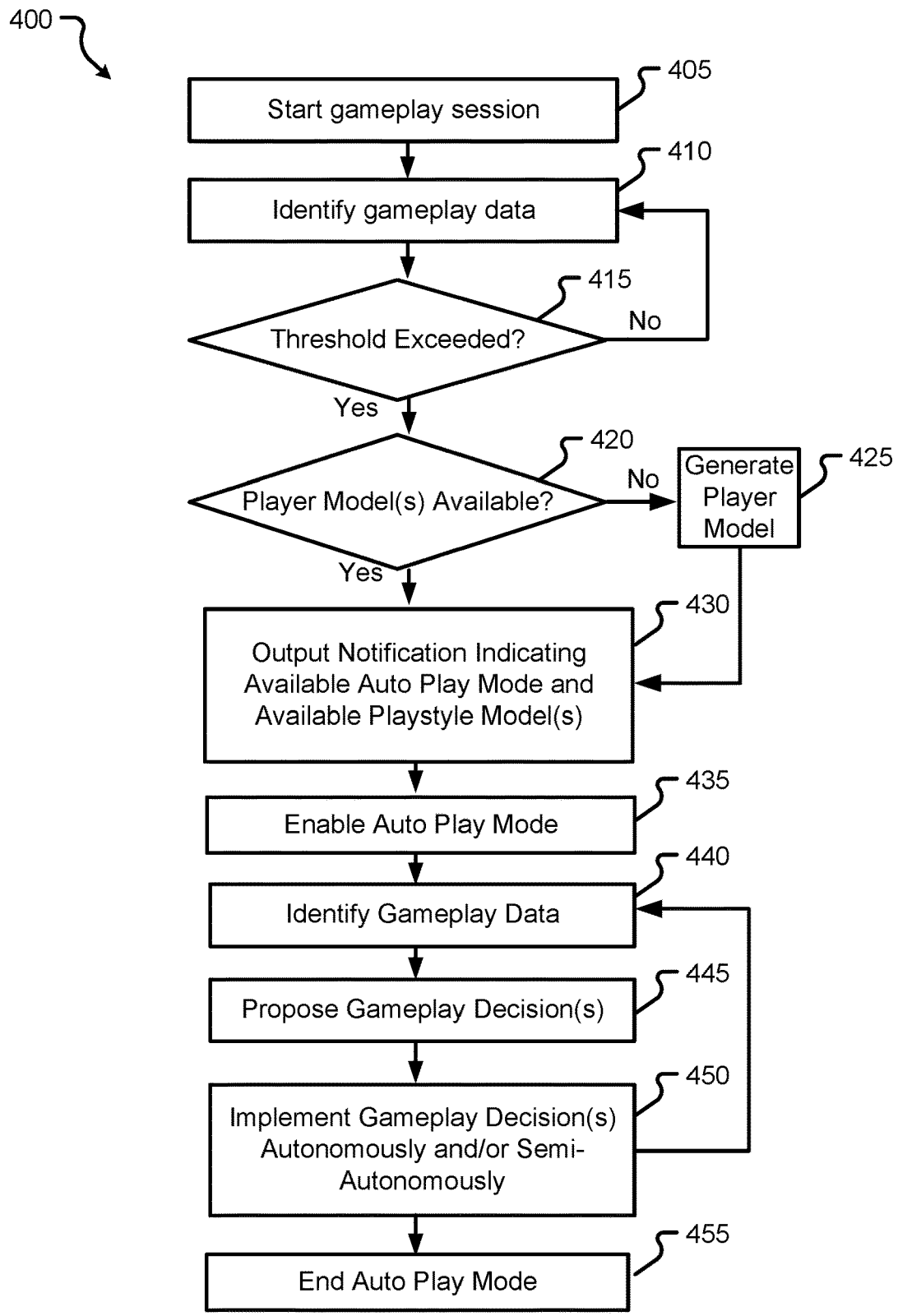
FIG. 4 is a process flow illustrating dynamically generating and applying enhanced auto play modes that are based on playstyle behavior in accordance with aspects of the present disclosure.

FIG. 4 illustrates an example of a process flow 400 that supports aspects of the present disclosure associated with dynamically providing enhanced auto play modes that are based on playstyle behavior. The process flow 400 supports aspects of the present disclosure associated with selecting a playstyle model and applying the playstyle model to an auto play mode at a gaming device 108. In some examples, process flow 400 may implement aspects of gaming system 100. Further, process flow 400 may be implemented by a gaming system 100 or components included therein as described with reference to FIGS. 1 through 3.

In the following description of the process flow 400, the operations may be performed in a different order than the order shown, or the operations may be performed in different orders or at different times. Certain operations may also be left out of the process flow 400, or other operations may be added to the process flow 400. It is to be understood that any device (e.g., a gaming device 108, a gaming server 116, a communication device 144, components of the system 100, etc.) may perform the operations shown.

At 405, a gaming server 116 may identify a gameplay session initiated at a gaming device 108 (e.g., based on a "card in" event at the gaming device 108, based on a player 112 inserting credits into the gaming device 108, based on a first gameplay decision by the player 112, etc.).

At 410, during the gameplay session, the gaming server 116 may identify gameplay data (e.g., gameplay decisions, wager amounts, etc.) associated with the gameplay session.

At 415, the gaming server 116 may determine whether a quantity of gameplay decisions associated with the gameplay session exceeds a quantity threshold (e.g., 20 plays, 20 spins, etc.). In some aspects, at 415, the gaming server 116 may determine whether a gameplay duration associated with the gameplay session exceeds a temporal threshold.

At 420, the gaming server 116 (e.g., using the machine learning engine 141) may identify a gameplay pattern corresponding to gameplay data of the gameplay session, based on the gameplay data. In some cases, at 420, the gaming server 116 (e.g., machine learning engine 141) may identify, from a set of available playstyle models, whether a playstyle model corresponds to the gameplay pattern corresponding to the gameplay session. For example, the gaming server 116 may identify whether a gameplay pattern associated with an available playstyle model matches the gameplay pattern corresponding to the gameplay session.

At 425, if the gaming server 116 identifies that no corresponding playstyle models are available (e.g., gameplay patterns associated with available playstyle models do not match the gameplay pattern corresponding to the gameplay session), the gaming server 116 (e.g., machine learning engine 141) may generate a playstyle model based on the gameplay data of the gameplay session and the associated gameplay pattern.

At 430, the gaming server 116 may enable user activation of an auto play mode and player configuration of the auto play mode. For example, the gaming server 116 may output (e.g., via the gaming device 108) a notification that the auto play mode has been unlocked for the player. The notification may include an indication of available playstyle models for the auto play mode.

At 435, the gaming server 116 may enable the auto play mode (e.g., based on a player confirmation, a player selection of a playstyle model, etc.).

At 440, during the gameplay session at the gaming device 108, the gaming server 116 may identify gameplay data (e.g., a decision event) associated with the gameplay session.

At 445, the gaming server 116 (e.g., the machine learning engine 141) may provide proposed gameplay decisions associated with decision events of the gameplay session. For example, the gaming server 116 may autonomously apply any combination of playstyle models (e.g., generate and/or suggest proposed gameplay decisions corresponding to any combination of playstyle models) described herein. In an example, the proposed gameplay decisions may include proposed wager amounts, proposed gameplay selections (e.g., payline selection, card draws, etc.), proposed selections of bonus prizes, etc. The proposed gameplay decisions may correspond to a gameplay pattern associated with the selected playstyle model.

At 450, the gaming device 108 may implement a proposed gameplay decision autonomously (e.g., in a fully-autonomous auto play mode). For example, the gaming device 108 may autonomously bet on behalf of a player in accordance with an applied playstyle model and corresponding gameplay decisions. Alternatively, or additionally, at, the gaming device 108 may implement a proposed gameplay decision semi-autonomously (e.g., in a semi-autonomous auto play mode). For example, the gaming device 108 may implement a proposed gameplay decision in response to a player input selecting a playstyle-based "Bet" button described herein. According to example aspects of the present disclosure, the autonomous application of the playstyle models and varying proposed gameplay decisions/gameplay behavior may be dynamic (e.g., different from static implementations in some other gaming systems).

At 455, the gaming server 116 may end the auto play mode at the gaming device 108. For example, the gaming server 116 may end the auto play mode based on a player input (e.g., a player input terminating the auto play mode, a cash out event at the gaming device 108, etc.). In another example, the gaming server 116 may end the auto play mode if a set duration associated with the auto play mode expires.

Aspects of the process flow 400 may include continuous monitoring of the gaming system 100. In some aspects, the monitoring may be implemented at the gaming server 116. In some other aspects, the monitoring may be implemented by tracking system separate from the gaming server 116, and the tracking system may report results of monitoring the gaming system 100 to the gaming server 116.

Figure 5:
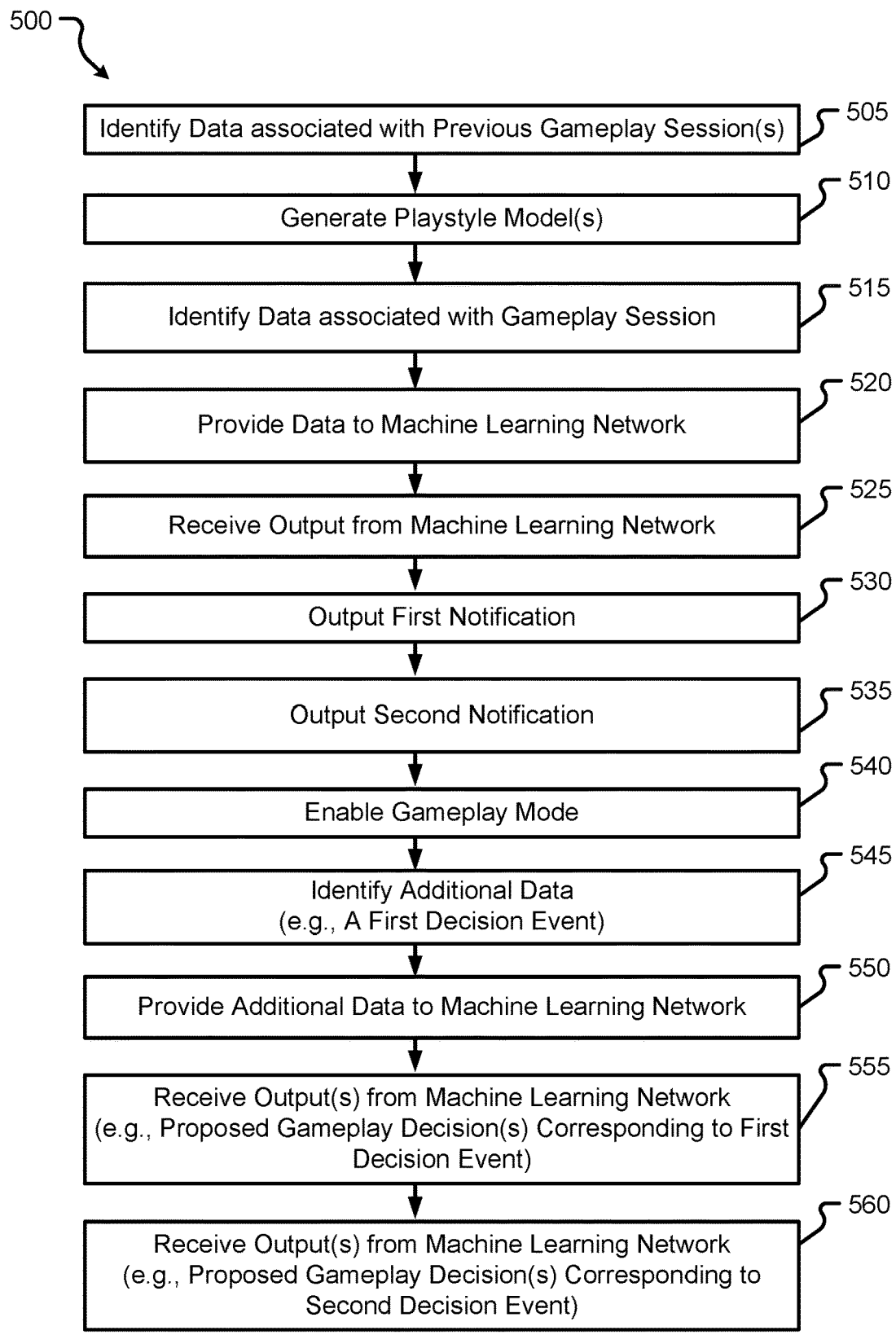
FIG. 5 is a process flow illustrating dynamically providing enhanced auto play modes that are based on playstyle behavior in accordance with aspects of the present disclosure.

FIG. 5 illustrates an example of a process flow 500 that supports aspects of the present disclosure associated with dynamically providing enhanced auto play modes at a gaming device 108 that are based on playstyle behavior, based on an analysis of gameplay data by a machine learning network included in the gaming system 100.

The process flow 500 supports aspects of the present disclosure associated with selecting a playstyle model and applying the playstyle model to an auto play mode at a gaming device 108. In some examples, process flow 500 may implement aspects of gaming system 100. Further, process flow 500 may be implemented by a gaming system 100 or components included therein as described with reference to FIGS. 1 through 3.

In the following description of the process flow 500, the operations may be performed in a different order than the order shown, or the operations may be performed in different orders or at different times. Certain operations may also be left out of the process flow 500, or other operations may be added to the process flow 500. It is to be understood that any device (e.g., a gaming device 108, a gaming server 116, a communication device 144, components of the system 100, etc.) may perform the operations shown.

At 505, the gaming server 116 may identify data associated with a set of previous gameplay sessions. The data may include a set of previous gameplay decisions associated with the set of previous gameplay sessions. For example, the data may include previous data (e.g., gameplay data, player behavior, gameplay decisions, etc.) from the same player as well as previous data (e.g., gameplay data, player behavior, gameplay decisions, etc.) from other players (e.g., similar players, players having similar playstyle characteristics, etc.). In some aspects, the set of previous gameplay sessions may be associated with a set of game types. The set of game types may include EGM wagering games (e.g., video poker, EGM-based slot machine, etc.) and non-EGM wagering games (e.g., mechanical slots, keno, poker, electronic table games, etc.) as described herein.

At 510, the gaming server 116 may generate a set of playstyle models based on the set of previous gameplay decisions associated with the set of game types. In some aspects, the set of playstyle models may be associated with the set of game types. In some examples, each playstyle model of the set of playstyle models may include a decision model associated with a set of gameplay parameters.

At 515, the gaming server 116 may identify data associated with the gameplay session, the data including a set of gameplay decisions received during the gameplay session.

At 520, the gaming server 116 may provide the data to a machine learning network.

At 525, the gaming server 116 may receive an output from the machine learning network in response to the machine learning network processing the second data. In some aspects, receiving the output from the machine learning network may be based on a temporal duration associated with the set of gameplay decisions. In some aspects, receiving the output from the machine learning network may be based on a quantity associated with the set of gameplay decisions.

In an example, the processing of the second data by the machine learning network may include: determining a gameplay pattern associated with the set of gameplay decisions; and identifying the playstyle model based on a comparison of the gameplay pattern associated with the set of gameplay decisions received during the gameplay session and a second gameplay pattern associated with the playstyle model.

In an example, the output at 525 may include an indication of a playstyle model of the set of playstyle models. In some aspects, the playstyle model may correspond to the set of gameplay decisions received during the gameplay session.

At 530, the gaming server 116 may output a first notification associated with a gameplay mode (e.g., an auto play mode) in which a playstyle model of the set of playstyle models may be utilized to provide automated player inputs to a gameplay session. For example, the automated player inputs may be dynamic (e.g., different from static implementations in some other gaming systems), aspects of which have been described herein. In an example, the first notification may include: an indication of the gameplay mode; an indication of the playstyle model; or both.

At 535, the gaming server 116 may output a second notification including an indication of a set of predicted gameplay parameters associated with applying the playstyle model to the gameplay session. In some aspects, the set of predicted gameplay parameters may include: a predicted gameplay duration associated with the playstyle model and the gameplay session; a predicted risk factor associated with the playstyle model and the gameplay session; or both.

At 540, the gaming server 116 may enable the gameplay mode in which the playstyle model of the set of playstyle models may be utilized to provide automated player inputs to a gameplay session. In an example, the playstyle model may be associated with a first game type of the set of game types, and the gameplay session may be associated with the first game type. In some aspects, the gameplay mode may include a fully-autonomous gameplay mode. For example, the gaming server 116 may autonomously generate, select, and/or apply playstyle models (e.g., the gaming server 116 may autonomously suggest and/or implement gameplay decisions) described herein. In some other aspects, the gameplay mode may include a semi-autonomous gameplay mode.

In some cases, the gaming server 116 may receive a user input including a selection of the playstyle model, and enabling the gameplay mode at 540 may be based on the selection. In some aspects, the user input may include a user input associated with modifying at least a portion of (e.g., one or more characteristics of) the playstyle model.

At 545, the gaming server 116 may identify additional data (e.g., a first decision event) associated with the gameplay session, the additional data including a first decision event associated with the gameplay session.

At 550, the gaming server 116 may provide the additional data to the machine learning network.

At 555, the gaming server 116 may receive a second output from the machine learning network in response to the machine learning network processing the additional data based on the playstyle model. In some aspects, the second output may include a proposed gameplay decision associated with the first decision event. In some cases, the gaming server 116 may update the playstyle model based on the second output from the machine learning network.

Alternatively, or additionally, at 555, the gaming server 116 may receive a third output from the machine learning network in response to the machine learning network processing the additional data according to a second playstyle model of the set of playstyle models. In some aspects, the third output may include a second proposed gameplay decision associated with the first decision event.

At 560, the gaming server 116 may receive a fourth output from the machine learning network in response to the machine learning network processing a result associated with the proposed gameplay decision and/or a result associated with the second proposed gameplay decision. In some aspects, the fourth output may include: a proposed gameplay parameter corresponding to a second decision event associated with the gameplay session.

In some aspects, the gaming server 116 may autonomously apply a gameplay decision corresponding to any of the first output (e.g., selection and application of a playstyle model), the second output (e.g., proposed gameplay decision associated with the first decision event), the third output (e.g., second proposed gameplay decision associated with the first decision event), and/or the fourth output (e.g., proposed gameplay parameter corresponding to a second decision event associated with the gameplay session).

A number of variations and modifications of the disclosure can be used. It would be possible to provide for some features of the disclosure without providing others.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the communication network includes a WAN, the gaming system includes a central server, central controller, or remote host and an EGM (or personal gaming device) each located in a different gaming establishment in a same geographic area, such as a same city or a same state. Gaming systems in which the communication network includes a WAN are substantially identical to gaming systems in which the communication network includes a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server."

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A method comprising:
identifying data associated with a set of previous gameplay sessions, the data comprising a set of previous gameplay decisions associated with the set of previous gameplay sessions;
generating a set of playstyle models based at least in part on the set of previous gameplay decisions; and
enabling a gameplay mode in which a playstyle model of the set of playstyle models is utilized to provide automated player inputs to a gameplay session in association with a proposed gameplay decision generated based on the playstyle model.

2. The method of claim 1, further comprising:
identifying second data associated with the gameplay session, the second data comprising a set of gameplay decisions received during the gameplay session;
providing the second data to a machine learning network; and
receiving an output from the machine learning network in response to the machine learning network processing the second data, the output comprising an indication of the playstyle model, wherein the playstyle model corresponds to the set of gameplay decisions.

3. The method of claim 2, wherein the processing of the second data by the machine learning network comprises:
determining a gameplay pattern associated with the set of gameplay decisions; and
identifying the playstyle model based at least in part on a comparison of the gameplay pattern associated with the set of gameplay decisions and a second gameplay pattern associated with the playstyle model.

4. The method of claim 2, wherein receiving the output from the machine learning network is based at least in part on a temporal duration associated with the set of gameplay decisions.

5. The method of claim 2, wherein receiving the output from the machine learning network is based at least in part on a quantity associated with the set of gameplay decisions.

6. The method of claim 1, wherein:
the set of previous gameplay sessions are associated with a set of game types;
the set of playstyle models are associated with the set of game types;
the playstyle model is associated with a first game type of the set of game types; and
the gameplay session is associated with the first game type.

7. The method of claim 1, wherein each playstyle model of the set of playstyle models comprises a decision model associated with a set of gameplay parameters.

8. The method of claim 1, further comprising:
receiving a user input comprising a selection of the playstyle model,
wherein enabling the gameplay mode is based at least in part on the selection.

9. The method of claim 1, further comprising:
identifying additional data associated with the gameplay session, the additional data comprising a first decision event associated with the gameplay session;
providing the additional data to a machine learning network; and
receiving a second output from the machine learning network in response to the machine learning network processing the additional data based at least in part on the playstyle model, wherein the second output comprises:
the proposed gameplay decision, wherein the proposed gameplay decision is associated with the first decision event.

10. The method of claim 9, further comprising:
updating the playstyle model based at least in part on the second output from the machine learning network.

11. The method of claim 9, further comprising:
receiving a third output from the machine learning network in response to the machine learning network processing the additional data according to a second playstyle model of the set of playstyle models, wherein the third output comprises:
a second proposed gameplay decision associated with the first decision event.

12. The method of claim 9, further comprising:
receiving a fourth output from the machine learning network in response to the machine learning network processing a result associated with the proposed gameplay decision, wherein the fourth output comprises:
a proposed gameplay parameter corresponding to a second decision event associated with the gameplay session.

13. The method of claim 1, wherein the gameplay mode comprises a fully-autonomous gameplay mode.

14. The method of claim 1, wherein the gameplay mode comprises a semi-autonomous gameplay mode.

15. The method of claim 1, further comprising:
outputting a first notification associated with the gameplay mode, the first notification comprising:
an indication of the gameplay mode; and
an indication of the playstyle model.

16. The method of claim 1, further comprising:
outputting a second notification comprising an indication of a set of predicted gameplay parameters associated with applying the playstyle model to the gameplay session,
wherein the set of predicted gameplay parameters comprise:
a predicted gameplay duration associated with the playstyle model and the gameplay session; and
a predicted risk factor associated with the playstyle model and the gameplay session.

17. A method comprising:
identifying data associated with a set of previous gameplay sessions, the data comprising a set of previous gameplay decisions associated with the set of previous gameplay sessions;
generating a set of playstyle models based at least in part on the set of previous gameplay decisions; and
enabling a gameplay mode in which a playstyle model of the set of playstyle models is utilized to provide automated player inputs to a gameplay session, wherein providing the automated player inputs comprises maintaining or updating one or more gameplay parameters based in part on the playstyle model and an outcome associated with the gameplay session.

18. The method of claim 17, further comprising:
identifying second data associated with the gameplay session, the second data comprising a set of gameplay decisions received during the gameplay session;
providing the second data to a machine learning network; and
receiving an output from the machine learning network in response to the machine learning network processing the second data, the output comprising an indication of the playstyle model, wherein the playstyle model corresponds to the set of gameplay decisions.

19. The method of claim 18, wherein the processing of the second data by the machine learning network comprises:
- determining a gameplay pattern associated with the set of gameplay decisions; and
- identifying the playstyle model based at least in part on a comparison of the gameplay pattern associated with the set of gameplay decisions and a second gameplay pattern associated with the playstyle model.

20. A method comprising:
- identifying, by a device, data associated with a set of previous gameplay sessions, the data comprising a set of previous gameplay decisions associated with the set of previous gameplay sessions;
- automatically generating, by the device in response to identifying the data, a set of playstyle models based at least in part on the set of previous gameplay decisions; and
- enabling, by the device, a gameplay mode in which a playstyle model of the set of playstyle models is utilized to provide automated player inputs to a gameplay session at the device or another device, wherein enabling the gameplay mode comprises providing volatility information associated with utilizing the playstyle model.

* * * * *